US008892497B2

(12) United States Patent
Konuma et al.

(10) Patent No.: US 8,892,497 B2
(45) Date of Patent: Nov. 18, 2014

(54) AUDIO CLASSIFICATION BY COMPARISON OF FEATURE SECTIONS AND INTEGRATED FEATURES TO KNOWN REFERENCES

(75) Inventors: Tomohiro Konuma, Osaka (JP); Akira Ishida, Tokyo (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 414 days.

(21) Appl. No.: 13/382,362

(22) PCT Filed: Mar. 15, 2011

(86) PCT No.: PCT/JP2011/001484
§ 371 (c)(1),
(2), (4) Date: Jan. 5, 2012

(87) PCT Pub. No.: WO2011/145249
PCT Pub. Date: Nov. 24, 2011

(65) Prior Publication Data
US 2012/0136823 A1      May 31, 2012

(30) Foreign Application Priority Data

May 17, 2010   (JP) ................. 2010-112936

(51) Int. Cl.
*G10L 25/48*   (2013.01)
*G06Q 10/10*   (2012.01)
*G06N 5/04*   (2006.01)
*G06N 99/00*   (2010.01)

(52) U.S. Cl.
CPC .............. *G10L 25/48* (2013.01); *G06Q 10/10* (2013.01); *G06N 99/005* (2013.01); *G06N 5/04* (2013.01)
USPC ......................................................... 706/54

(58) Field of Classification Search
CPC ....... G06N 5/04; G06N 99/005; G06Q 10/10; G10L 25/48

USPC ......................................... 706/54; 704/E11.2
See application file for complete search history.

(56) References Cited

U.S. PATENT DOCUMENTS

2002/0111798 A1   8/2002  Huang
2003/0236663 A1   12/2003  Dimitrova et al.

(Continued)

FOREIGN PATENT DOCUMENTS

CN          1543639       11/2004
CN          1662956       8/2005

(Continued)

OTHER PUBLICATIONS

Pohle et al., Evaluation of Frequently Used Audio Features for Classification of Music into Perceptual Categories, In Proceedings of the Fourth International Workshop on Content-Based Multimedia Indexing, 2005.*

(Continued)

*Primary Examiner* — Li-Wu Chang
*Assistant Examiner* — Robert H Bejcek, II
(74) *Attorney, Agent, or Firm* — Wenderoth, Lind & Ponack, L.L.P.

(57) ABSTRACT

To classify moving images using audio signals. An audio signal is acquired, a section feature relating to an audio frequency distribution is extracted with respect to each of a plurality of sections each having a predetermined length contained in the acquired audio signal, each extracted section feature is compared with each of reference section features to calculate a section similarity indicating a degree of correlation between each section feature and each reference section feature. An integrated feature relating to the plurality of sections and being calculated based on the section similarity calculated with respect to each of the plurality of sections is extracted from the acquired audio signal. The extracted integrated feature is compared with each of one or more reference integrated features, and the audio signal is classified based on comparison result. Then, classification result is used for moving image classification.

12 Claims, 19 Drawing Sheets

(56) References Cited

U.S. PATENT DOCUMENTS

| | | |
|---|---|---|
| 2004/0167767 A1 | 8/2004 | Xiong et al. |
| 2008/0281590 A1 | 11/2008 | Breebaart et al. |
| 2009/0069914 A1 | 3/2009 | Kemp et al. |
| 2009/0306797 A1 | 12/2009 | Cox et al. |
| 2010/0094633 A1 | 4/2010 | Kawamura et al. |

FOREIGN PATENT DOCUMENTS

| | | |
|---|---|---|
| CN | 101636783 | 1/2010 |
| JP | 10-187182 | 7/1998 |
| JP | 2004-258659 | 9/2004 |
| JP | 2005-530214 | 10/2005 |
| JP | 2006-276854 | 10/2006 |
| JP | 2009-508156 | 2/2009 |
| JP | 2009-511980 | 3/2009 |
| WO | 2004/001720 | 12/2003 |

OTHER PUBLICATIONS

Burred et al., Semantic Multimedia and Ontologies, Chapter 5: Audio Content Analysis, Eds. Kompatsiaris et al., 2008.*

Foote, Content-Based Retrieval of Music and Audio, Multimedia Storage and Archiving Systems II, Proc. of SPIE, 1997.*

Logan et al., A Music Similarity Function Based on Signal Analysis, Cambridge Research Laboratory, 2001.*

Meng et al., Improving Music Genre Classification by Short-Time Feature Integration, Acoustics, Speech, and Signal Processing, 2005. Proceedings. (ICASSP '05). IEEE International Conference on (vol. 5 ), 2005.*

Li et al., Classification of General Audio Data for Content-Based Retrieval, Pattern Recognition Letters, vol. 22, pp. 533-544, 2001.*

Wold et al., Classification, Search, and Retrieval of Audio, CRC Handbook of Multimedia Computing, 1999.*

International Search Report issued Jun. 14, 2011 in corresponding International Application No. PCT/JP2011/001484.

Yuya Akita et al., "Unsupervised Speaker Indexing of Discussions Using Anchor Models", The IEICE Transactions D-II, vol. J87-D-II, No. 2, Feb. 2004, pp. 495-503 (with partial English translation).

Search Report issued Jul. 3, 2013 in corresponding Chinese Application No. 201180002867.5 (with English translation).

* cited by examiner

| Section | Section feature | | | | |
|---|---|---|---|---|---|
| | A001 | A002 | A003 | ... | A100 |
| 0-10 ms | 0.410 | 0.784 | 0.394 | ... | 0.107 |
| 10-20 ms | 0.390 | 0.808 | 0.426 | ... | 0.111 |
| 20-30 ms | 0.347 | 0.724 | 0.443 | ... | 0.161 |
| ⋮ | ⋮ | ⋮ | ⋮ | ⋮ | ⋮ |
| 1000-1010 ms | 0.128 | 0.091 | 0.431 | ... | 0.801 |
| ⋮ | ⋮ | ⋮ | ⋮ | ⋮ | ⋮ |
| 4990-5000 ms | – | – | – | ... | – |

FIG. 6

| | Feature ID | Reference section feature | | | | |
|---|---|---|---|---|---|---|
| | | A001 | A002 | A003 | ... | A100 |
| Music | F001 | (Section feature of music) | | | | |
| Outdoor sound | F002 | (Section feature of outdoor sound) | | | | |
| Indoor sound | F003 | (Section feature of indoor sound) | | | | |
| ⋮ | ⋮ | ⋮ | | | | |
| Cheer | F100 | (Section feature of cheer) | | | | |

FIG. 7

| Section | Section similarity ||||| 
|---|---|---|---|---|---|
| | F001 | F002 | F003 | ... | F100 |
| 0-10 ms | 0.819 | 0.113 | 0.747 | ... | 0.084 |
| 10-20 ms | 0.780 | 0.109 | 0.740 | ... | 0.083 |
| 20-30 ms | 0.823 | 0.171 | 0.837 | ... | 0.129 |
| ⋮ | ⋮ | ⋮ | ⋮ | ⋮ | ⋮ |
| 1000-1010 ms | 0.091 | 0.660 | 0.149 | ... | 0.692 |
| ⋮ | ⋮ | ⋮ | ⋮ | ⋮ | ⋮ |
| 4990-5000 ms | − | − | − | ... | − |

FIG. 8

| Section | Representative section feature |
|---|---|
| 0-10 ms | F001 |
| 10-20 ms | F001 |
| 20-30 ms | F003 |
| ⋮ | ⋮ |
| 1000-1010 ms | F100 |
| ⋮ | ⋮ |
| 4990-5000 ms | — |

AUDIO CLASSIFICATION BY COMPARISON OF FEATURE SECTIONS AND INTEGRATED FEATURES TO KNOWN REFERENCES

CROSS REFERENCE TO RELATED APPLICATION

The present application is the National Stage of International Application No. PCT/JP2011/001484, filed Mar. 15, 2011.

TECHNICAL FIELD

The present invention relates to an art of processing multimedia contents, and particularly to an art of classifying multimedia contents with use of audio contained therein.

BACKGROUND ART

In recent years, with the widespread use of a mobile phone having a moving image shooting function, a digital video camera, and the like, individual users have become able to hold an enormous number of multimedia contents (moving images with audio, and hereinafter referred to as just "moving images"). This leads to a demand for a means for efficiently searching for a moving image.

Conventional methods of searching for a moving image includes a method of searching for a moving image with use of a title thereof by applying a title to each moving image in advance, a method of searching for a moving image with use of a category to which the moving image belongs by classifying each moving image into any one of a plurality of categories in advance, and so on.

There has also been used a method of searching for a moving image by creating a thumbnail of each moving image in advance and displaying the created thumbnails of the moving images side-by-side. This allows users to easily search for a moving image with his eyes.

However, these methods require users to perform an operation of applying an appropriate title to each moving image, classifying each moving image into a category, creating a thumbnail of each moving image, or the like. This is troublesome.

By the way, as an art relating to classification of moving images, there has been disclosed an art of extracting a highlight part from a moving image of sports focusing on audio (see Patent Literature 1). According to the art of the Patent Literature 1, a feature is extracted from each of short time sections (of approximately 30 ms) of audio contained in a moving image, and a period, in which audio having a specific feature (such as applause and shout of joy) lasts for a predetermined period or longer, is classified as a highlight part.

Furthermore, as an art relating to audio classification, there has been disclosed an art of classifying a voice of an unknown speaker in discussions (see Non-Patent Literature 1). According to the art of the Non-Patent Literature 1, a piece of feature data with respect to each of many speakers is prepared in advance, and clustering is performed based on a similarity between audio and each piece of the feature data, thereby classifying a section in which each speaker's voice is output.

With the above two arts, it is possible to classify which part (of approximately several milliseconds to several seconds) of audio contained in a moving image represents what type of sound. For example, with the art of the Patent Literature 1, it is possible to classify a part in which massive applause lasts for a predetermined period or longer, as a highlight part in which an event comes to a climax. Also, with the art of the Non-Patent Literature 1, it is possible to classify which speaker is speaking in which part of discussions.

CITATION LIST

Patent Literature

[Patent Literature 1] Japanese Patent Application Publication No. 2004-258659

Non-Patent Literature

[Non-Patent Literature 1] AKITA Yuya and KAWAHARA Tatsuya, "Unsupervised Speaker Indexing of Discussions Using Anchor Models", The Institute of Electronics, Information and Communication Engineers, 2004/2 Vol. J87-D-II No. 2, pp. 495-503

SUMMARY OF INVENTION

Technical Problem

These conventional arts enable to extract a part belonging to a specific category (such as a specific speaker and a highlight scene), from audio composed of a mixture of various sounds. However, it is impossible to classify what type of event or situation the audio composed of the mixture of various sounds relates to. Here, the event or the situation indicates a party, a meeting, sports, and so on.

Accordingly, even if these arts are applied to audio contained in a moving image, it is impossible to appropriately classify the moving image.

In view of the above problem, the present invention aims to provide a device, a method, a program, and an integrated circuit that are capable of appropriately classifying audio composed of a mixture of various sounds contained in moving images so as to classify the moving images to save time and effort of searching for a moving image.

Solution to Problem

In order to solve the above problem, an audio classification device relating to the present invention comprises: an acquisition unit operable to acquire an audio signal; a section feature extraction unit operable, with respect to each of a plurality of sections each having a predetermined length contained in the audio signal, to extract a section feature relating to an audio frequency distribution; a reference section feature storage unit that stores therein a plurality of reference section features that are each a reference for a comparison with each of the extracted section features; a calculation unit operable, with respect to each of the plurality of sections, to make a comparison between the section feature and each of the reference section features to calculate a section similarity indicating a degree of correlation between the section feature and each of the reference section features; an integrated feature extraction unit operable to extract, from the audio signal, an integrated feature relating to the plurality of sections, the integrated feature being calculated based on the section similarity calculated with respect to each of the plurality of sections; a reference integrated feature storage unit that stores therein one or more reference integrated features that are each a reference for a comparison with the integrated feature; and a classification unit operable to make a comparison between the integrated feature with each of the one or more reference integrated features, and classify the audio signal based on a result of the comparison.

Advantageous Effects of Invention

According to the audio classification device having the above structure, the section similarity is calculated, which indicates how much and what type of sound each of the plurality of sections contained in the audio signal has a correlation with. Then, the integrated feature is extracted from the audio signal based on the section similarity of each of the plurality of sections. The integrated feature extracted in this way represents how various types of sounds contained in the audio signal are mixed, and accordingly reflects an event or a situation from which the audio signal has been derived. Then, the audio signal is classified by comparing the integrated feature with each of the reference integrated features that are each data of classification reference.

By integrating the feature of each of the plurality of sections in this way, it is possible to appropriately classify audio composed of a mixture of various sounds.

BRIEF DESCRIPTION OF DRAWINGS

FIG. 6 shows the data structure of a section feature dictionary and an example thereof.

FIG. 7 shows an example of a section similarity with a section feature of each section.

FIG. 8 shows an example of a representative section feature of each section.

DESCRIPTION OF EMBODIMENTS

The following describes, as an embodiment of the present invention, a video recording device that classifies a moving image with audio (hereinafter referred to as just "moving image") based on an audio signal contained in the moving image, with reference to the drawings.

1. Embodiment 1

<1-1. Outline>

Figure 1:
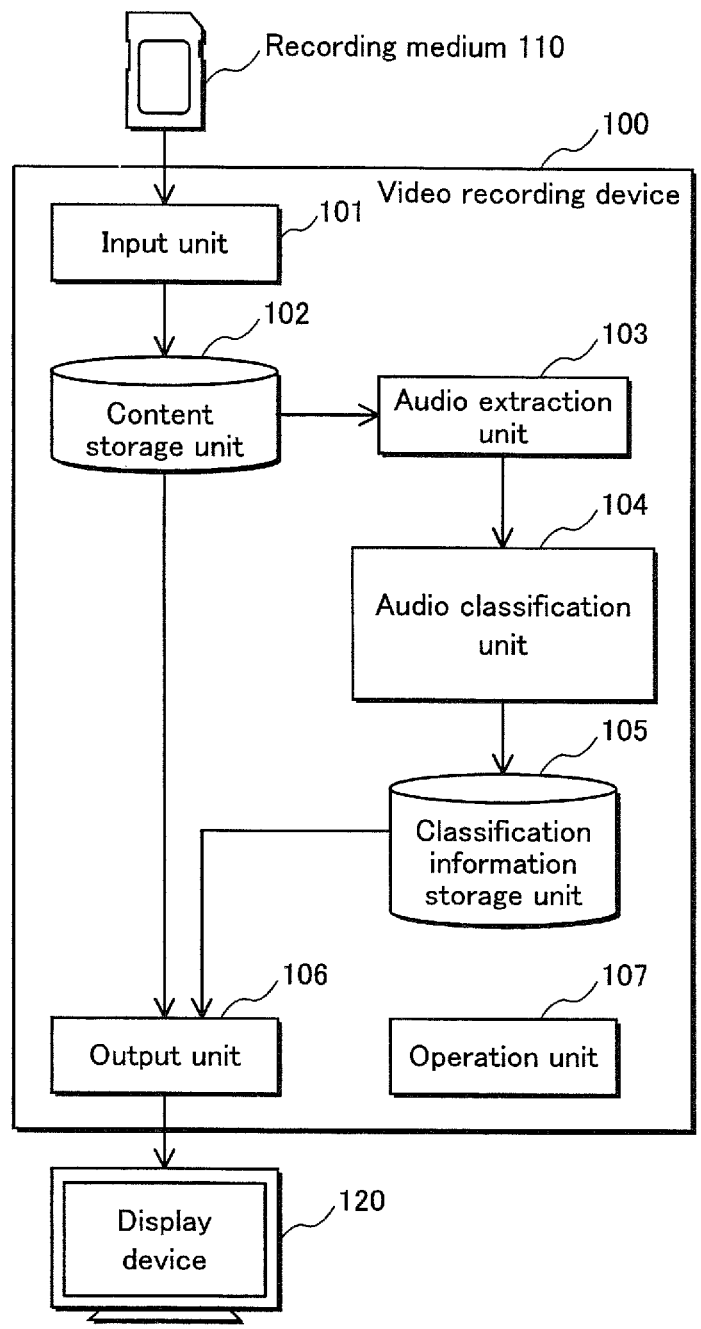
FIG. 1 shows the functional structure of a video recording device relating to an embodiment 1 of the present invention and peripheral devices thereof.

FIG. 1 shows a video recording device 100 relating to an embodiment 1 of the present invention and peripheral devices thereof. A recording medium 110 records therein a file group of moving images. A display device 120 displays a video output from the video recording device 100. Here, the file group means a group of one or more files.

The video recording device 100 acquires the file group of moving images from the recording medium 110, and records therein the acquired file group. The video recording device 100 classifies each of the moving images included in the recorded file group into a category, based on an audio signal contained in the moving image. Here, the category means a destination into which the moving image is classified.

Then, in response to a user operation, the video recording device 100 outputs a video according to a classification result to the display device 120.

Classification of an audio signal is performed in the following manner.

Figure 5:
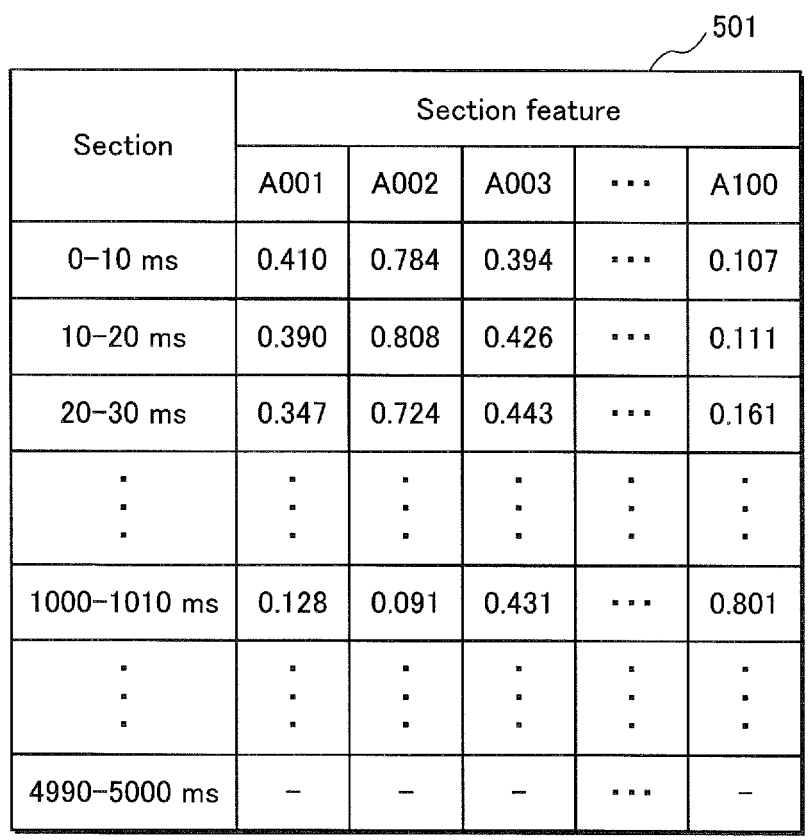
FIG. 5 shows the structure of a section feature and an example of a section feature extracted from each section.

Firstly, acoustic analysis is performed with respect to each of a plurality of sections each having a predetermined time length (10 ms, for example) of an audio signal that is a classification target, thereby extracting a section feature (see FIG. 5). A comparison is made between the extracted section feature and each of predetermined reference section features (see FIG. 6), thereby calculating a similarity (see FIG. 7). Then, a reference section feature having the highest similarity is obtained with respect to each section (see FIG. 8). Hereinafter, a section having the predetermined time length is referred to as "short time section", and a reference section feature having the highest similarity is referred to as "representative section feature".

Here, the section feature represents how much and what type of audio feature each of a plurality of short time sections of an audio signal has. Also, the reference section features are each a reference for a comparison with a section feature, and differ from each other.

Figure 9:
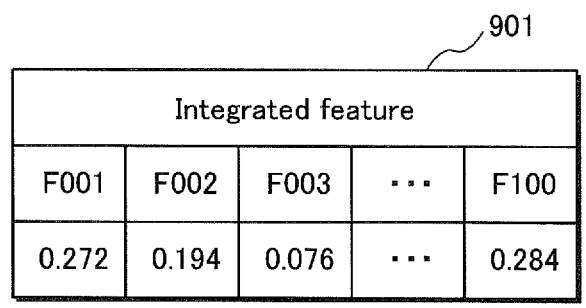
FIG. 9 shows the data structure of an integrated feature and an example thereof.

Next, an integrated feature, which is one feature relating to the plurality of short time sections of the audio signal, is extracted, with use of the representative section feature calculated with respected to each of the plurality of short time sections (see FIG. 9).

Here, the integrated feature is represented as a containing degree with respect to each reference section feature. The containing degree indicates how much of a short time section, in which the reference section feature is a representative section feature, is contained in the audio signal. The containing degree of the reference section feature is obtained by counting the number of short time sections in which the reference section feature is a representative section feature, and calculating a proportion of the counted number to the total number of short time sections contained in the audio signal that is the classification target.

Then, a comparison is made between the integrated feature of the audio signal that is the classification target and a reference integrated feature for each category (see FIG. 10) which are each for use as a predetermined classification reference, thereby classifying the audio signal. A classification result of the audio signal is used for classifying a moving image containing the audio signal.

1-2. Structure
<1-2-1. Entire Structure>

The video recording device 100 includes, as hardware, an input device that acquires a file group of moving images, an output terminal that outputs a video, a push-button that receives a user operation, a memory that stores therein data and programs, and a processor that executes the programs.

As shown in FIG. 1, the video recording device 100 includes an input unit 101, a content storage unit 102, an audio extraction unit 103, an audio classification unit 104, a classification information storage unit 105, an output unit 106, and an operation unit 107.

Functions of the input unit 101, the audio extraction unit 103, the output unit 106, and the operation unit 107 are realized by the processor executing the programs stored in the memory.

The content storage unit 102 and the classification information storage unit 105 are realized by the memory.

The input unit 101 has an input device from which the recording medium 110 is detachable, and has a function of acquiring a file group of moving images from the recording medium 110 attached to the input device. Furthermore, the input unit 101 stores the acquired file group in the content storage unit 102.

The content storage unit 102 is a region of the memory for storing therein the file group acquired by the input unit 101.

The audio extraction unit 103 has a function of extracting an audio signal from a file of moving image stored in the content storage unit 102. Also, the audio extraction unit 103 decodes an encoded audio signal.

The audio classification unit 104 has a function of classifying the audio signal extracted by the audio extraction unit 103. The audio classification unit 104 stores a classification result of the audio signal in the classification information storage unit 105, in correspondence with a file name identifying the file of moving image containing the audio signal and a category ID identifying a classification destination into which the audio signal is classified.

The classification information storage unit 105 is a region of the memory for storing therein a result of classification performed on an audio signal by the audio classification unit 104.

The output unit 106 has an output terminal, and has a function of outputting a video to the display device 120.

The operation unit 107 has a push-button or the like, and has a function of receiving a user operation.

<1-2-2. Structure of Audio classification Unit 104>

The following describes the audio classification unit 104 in further detail.

Figure 2:
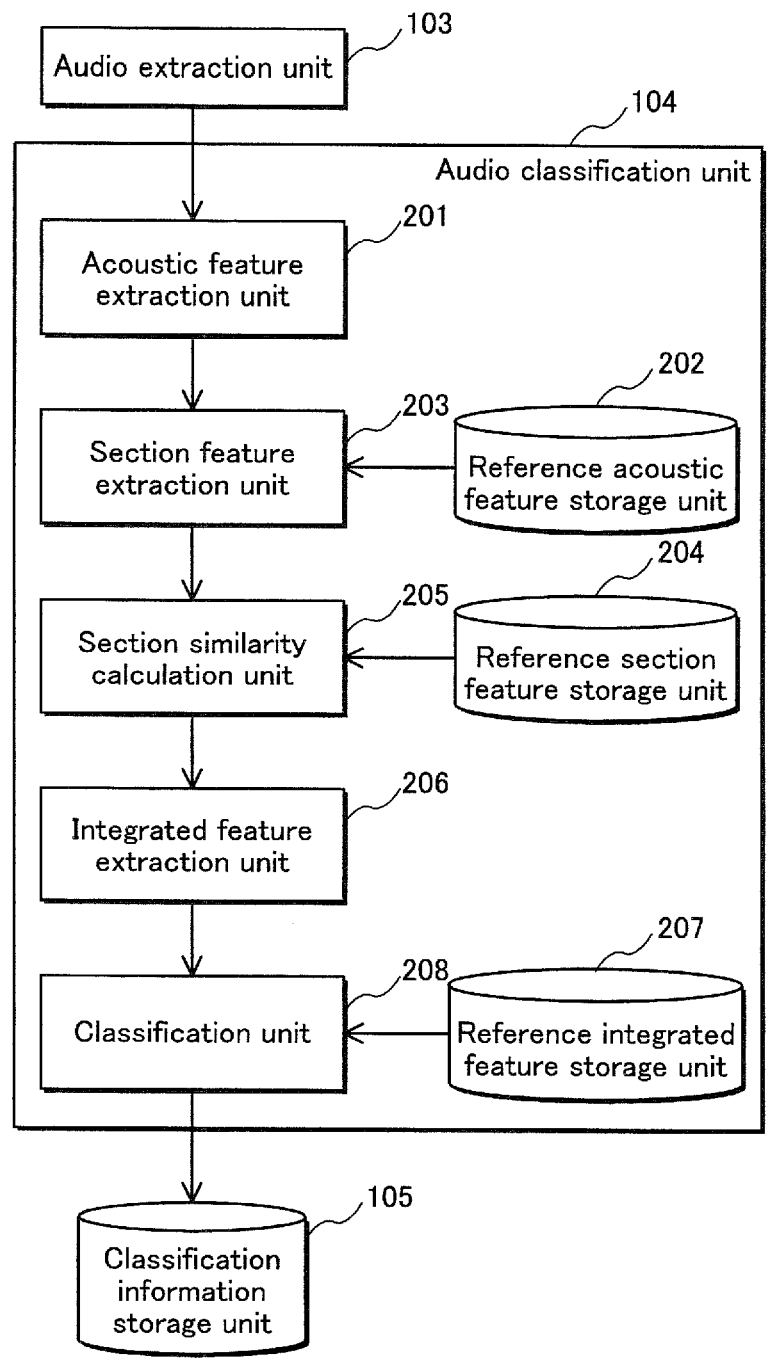
FIG. 2 shows the functional structure of an audio classification unit.

FIG. 2 shows the functional structure of the audio classification unit 104.

The audio classification unit 104 includes an acoustic feature extraction unit 201, a reference acoustic feature storage unit 202, a section feature extraction unit 203, a reference section feature storage unit 204, a section similarity calculation unit 205, an integrated feature extraction unit 206, a reference integrated feature storage unit 207, and a classification unit 208.

Functions of the acoustic feature extraction unit 201, the section feature extraction unit 203, the section similarity calculation unit 205, the integrated feature extraction unit 206, and the classification unit 208 are realized by the processor executing the programs stored in the memory.

The reference acoustic feature storage unit 202, the reference section feature storage unit 204, and the reference integrated feature storage unit 207 are realized by the memory.

Figure 3:
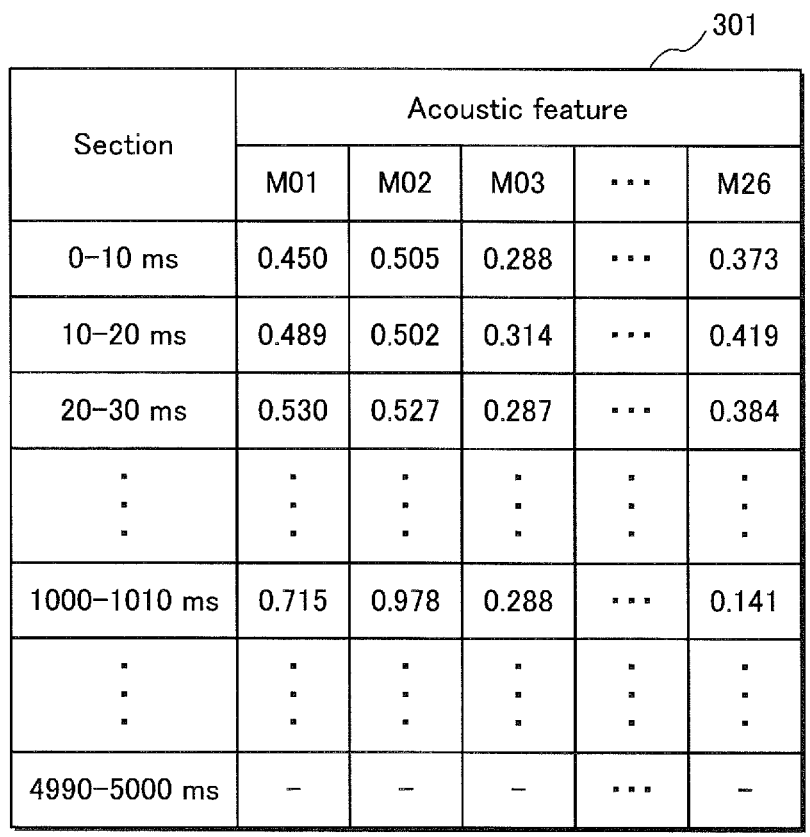
FIG. 3 shows the structure of an acoustic feature and an example of an acoustic feature extracted from each section.

The acoustic feature extraction unit 201 has a function of extracting an acoustic feature 301 for use in extracting a section feature with respect to each of short time sections of an audio signal extracted by the audio extraction unit 103. FIG. 3 shows the data structure and an extraction result of the acoustic feature 301.

MFCC (Mel-Frequency Cepstral Coefficient) can be used for representing the acoustic feature 301. With use of the MFCC, the acoustic feature 301 can be represented as a vector having a predetermined number of dimensions. The following description is given taking an example where the acoustic feature 301 is represented as a 26-dimensional vector.

As shown in FIG. 3, the acoustic feature 301 is represented as a vector having 26-dimensional components of M01-M26. FIG. 3 shows an example where extraction of the acoustic feature 301 from each section of an audio signal of 5000 ms is in progress. From each of short time sections ranging from a short time section of 0-10 ms to a short time section of 1000-1010 ms, the acoustic feature 301 has already been extracted. From a short time section of 4990-5000 ms, the acoustic feature 301 has not yet been extracted.

The reference acoustic feature storage unit 202 is a region of the memory that stores therein data of an acoustic feature dictionary 400 for use by the section feature extraction unit 203.

Figure 4:
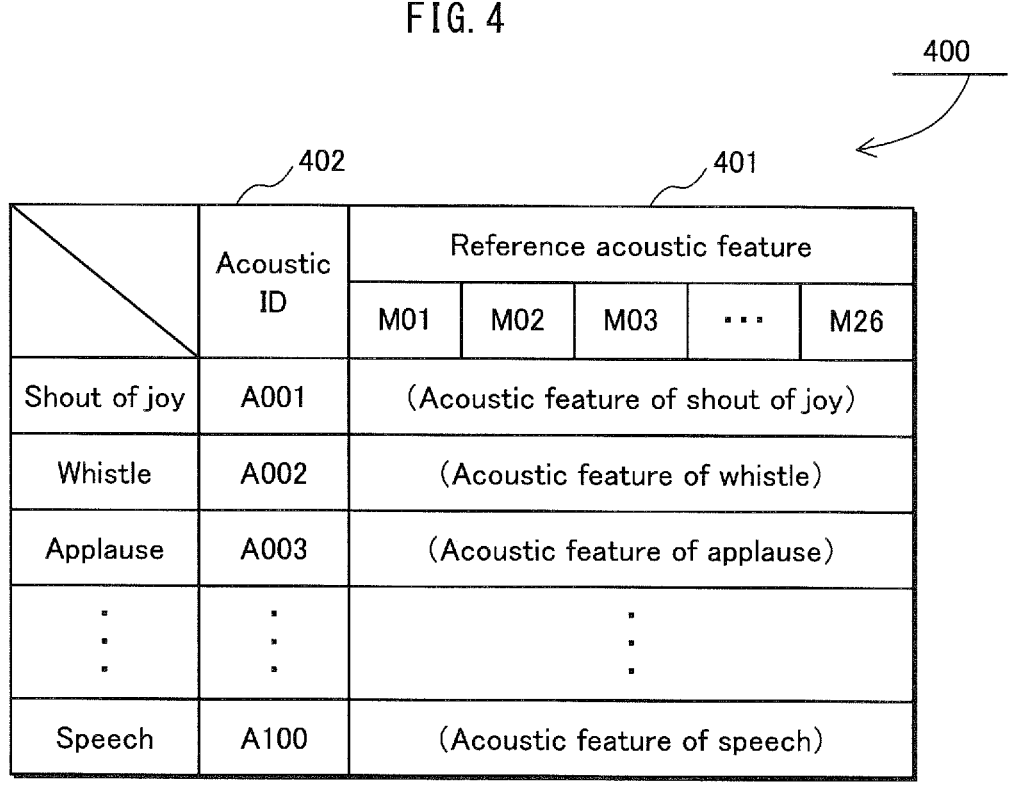
FIG. 4 shows the data structure of an acoustic feature dictionary and an example thereof.

FIG. 4 shows the data structure of the acoustic feature dictionary 400 and an example of thereof. As shown in FIG. 4, the acoustic feature dictionary 400 contains pairs each composed of a reference acoustic feature 401 and an acoustic ID (IDentifier) 402. In FIG. 4, a name corresponding to each reference acoustic feature 401 is labeled (in the leftmost column) for convenience of description. However, such a name does not actually need to be contained in the acoustic feature dictionary 400.

Here, the reference acoustic feature 401 is data for use by the section feature extraction unit 203 for comparing with the acoustic feature 301 of each short time section. The reference acoustic feature 401 has a structure equivalent to that of the acoustic feature 301. The reference acoustic feature 401 here is represented as a vector having 26-dimensional components of M01-M26, as the same as the acoustic feature 301. The reference acoustic feature 401 represents a feature of a sound (such as shout of joy and whistle) played in each short time section.

Also, the acoustic ID 402 is an ID for identifying the reference acoustic feature 401. The acoustic IDs 402 are in one-to-one correspondence with the reference acoustic features 401.

In the example shown in FIG. 4, the acoustic feature dictionary 400 contains one hundred reference acoustic features 401 such as "shout of joy" and "whistle" each having a different one of the acoustic IDs 402 "A001"-"A100". For example, a reference acoustic feature 401 of "shout of joy" is data created from an audio signal in which a sound of shout of joy is recorded.

The acoustic feature dictionary 400 has been created in advance, and is stored in the reference acoustic feature storage unit 202. The acoustic feature dictionary 400 is never modified.

Hereinafter, when a reference acoustic feature 401 contained in the acoustic feature dictionary 400 shown in FIG. 4 is taken as an example, this reference acoustic feature 401 is called using an acoustic ID 402 corresponding thereto. For example, a reference acoustic feature 401 identified by an acoustic ID 402 "A001" is called "reference acoustic feature A001".

The section feature extraction unit 203 has a function of extracting a section feature 501 with respect to each short time section. FIG. 5 shows the data structure of the section feature 501 and an example of an extraction result thereof.

The section feature 501 is data that represents how much and what type of sound each short time section of an audio signal contains, and is composed of a similarity between the acoustic feature 301 and the reference acoustic feature 401. The similarity is calculated based on a Euclidean distance between a vector representing the acoustic feature 301 and a vector representing the reference acoustic feature 401. Hereinafter, the similarity between the acoustic feature 301 and the reference acoustic feature 401 is referred to as "acoustic similarity".

As shown in FIG. 5, the section feature 501 is composed of an acoustic similarity between the acoustic feature 301 and each of the reference acoustic features 401 contained in the acoustic feature dictionary 400 (reference acoustic features "A001"-"A100", here). The section feature 501 is represented as a 100-dimensional vector having the above acoustic similarities as components.

FIG. 5 shows an example where extraction of the section feature 501 from each section of the audio signal of 5000 ms is in progress. From each of the short time sections ranging from the short time section of 0-10 ms to the short time section of 1000-1010 ms, the section feature 501 has already been extracted. From the short time section of 4990-5000 ms, the section feature 501 has not yet been extracted.

The reference section feature storage unit 204 is a region of the memory that stores therein data of a section feature dictionary 600 for use by the section similarity calculation unit 205.

FIG. 6 shows the data structure of the section feature dictionary 600 and an example thereof. As shown in FIG. 6, the section feature dictionary 600 contains pairs each composed of a reference section feature 601 and a feature ID 602. In FIG. 6, a name corresponding to each reference section feature 601 is labeled (in the leftmost column) for convenience of description. However, such a name does not actually need to be contained in the section feature dictionary 600.

Here, the reference section feature 601 is data for use by the section similarity calculation unit 205 for comparing with the section feature 501 of each short time section. The reference section feature 601 has a structure equivalent to that of the section feature 501. Here, the reference section feature 601 is composed of data which is equivalent in structure to the section feature 501, that is, data equivalent to the acoustic similarity between the acoustic feature 301 and each of the reference acoustic features 401 contained in the acoustic feature dictionary 400. The reference section feature 601 is represented as a 100-dimensional vector, as well as the section feature 501.

The reference section feature 601 represents a situation in each short time section, such as a situation where music is played and an outdoor situation.

Also, the feature ID 602 is an ID for identifying the reference section feature 601. The feature IDs 602 are in one-to-one correspondence with the reference integrated features 601.

In the example shown in FIG. 6, the section feature dictionary 600 contains one hundred reference section features 601 such as "music" and "outdoor sound" each having a different one of the feature IDs 602 "F001"-"F100". For example, a reference acoustic feature 601 of "music" is data created from an audio signal in which music is recorded.

The section feature dictionary 600 has been created in advance, and is stored in the reference section feature storage unit 204. The section feature dictionary 600 is never modified.

Hereinafter, when a reference section feature 601 contained in the section feature dictionary 600 shown in FIG. 6 is taken as an example, this reference section feature 601 is called using a feature ID 602 corresponding thereto. For example, a reference section feature 601 identified by a feature ID 602 "F001" is called "reference section feature F001".

The section similarity calculation unit 205 has a function of calculating a similarity between the section feature 501 extracted with respect to each short time section by the section feature extraction unit 203 and each of the reference section features 601. Here, the similarity between the section feature 501 and the reference section feature 601 is referred to as "section similarity".

FIG. 7 shows an example of the section similarity calculated by the section similarity calculation unit 205. As shown in FIG. 7, the section similarity is calculated with respect to each of the reference section features F001-F100, with respect to each short time section. FIG. 7 shows an example where calculation of the section similarity with respect to each section of the audio signal of 5000 ms is in progress. From each of the short time sections ranging from the short time section of 0-10 ms to the short time section of 1000-1010 ms, the section similarity has already been calculated. From the short time section of 4990-5000 ms, the section similarity has not yet been calculated.

Furthermore, based on a calculation result of the section similarity, the section similarity calculation unit 205 determines a representative section feature with respect to each short time section of the audio signal, which is a reference section feature having the highest section similarity in the short time section. The representative section feature represents a classification result of a situation in each short time section that is a processing target.

FIG. 8 shows an example of the representative section feature determined by the section similarity calculation unit 205. In the example shown in FIG. 8, with respect to the short time section of 0-10 ms, the reference section feature F001 is determined as a representative section feature, which has the highest section similarity in the short time section of 0-10 ms as shown in FIG. 7. Similarly, with respect to each of other short time sections, a reference section feature having the highest section similarity in the short time section is determined as a representative section feature.

The integrated feature extraction unit 206 has a function of extracting an integrated feature 901 based on the representative section feature determined with respect to each short time section by the section similarity calculation unit 205. FIG. 9 shows the data structure of the integrated feature 901 and an example thereof.

The integrated feature 901 is a feature relating to all the short time sections contained in the audio signal, and represents an overall situation (such as a party and a meeting) recorded in the audio signal.

Here, the integrated feature 901 is composed of a containing degree of each reference section feature. The containing degree indicates how much of a short time section, in which the reference section feature is a representative section feature, is contained in the audio signal.

As shown in FIG. 9, the integrated feature 901 is composed of a containing degree of each of the reference section features 601 contained in the section feature dictionary 600 (reference section features F001-F100, here). The integrated feature 901 is represented as a 100-dimensional vector having the above containing degrees as components.

The reference integrated feature storage unit 207 is a region of the memory that stores therein data of an integrated feature dictionary 1000 for use by the classification unit 208.

Figure 10:
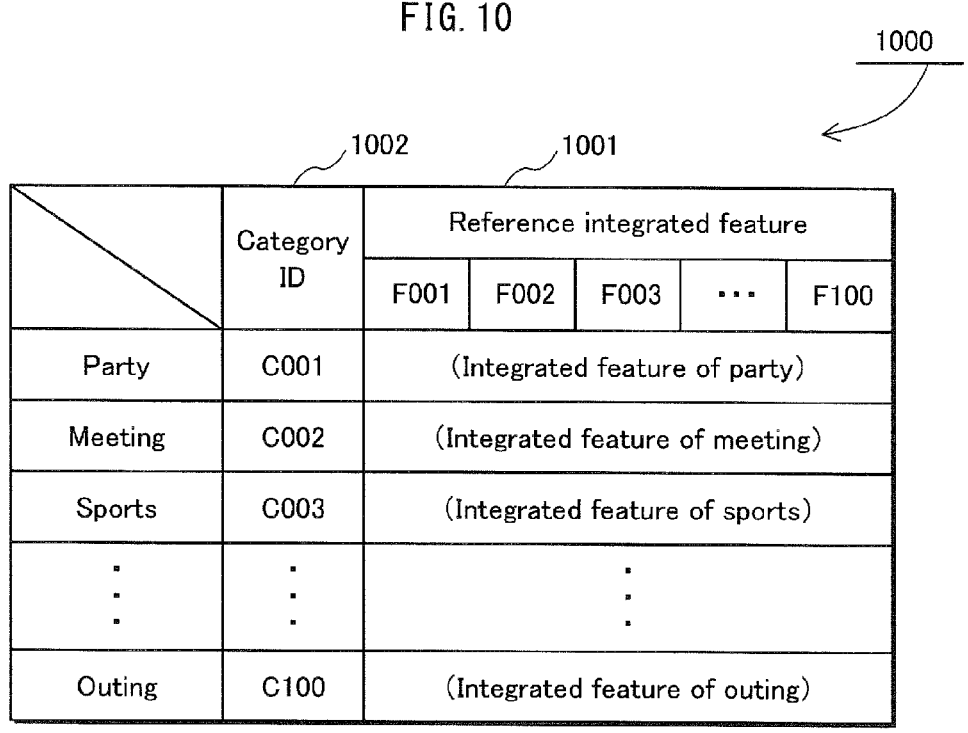
FIG. 10 shows the data structure of an integrated feature dictionary and an example thereof.

FIG. 10 shows the data structure of the integrated feature dictionary 1000 and an example thereof. As shown in FIG. 10, the integrated feature dictionary 1000 contains pairs each composed of a reference integrated feature 1001 and a category ID 1002. In FIG. 10, a name corresponding to each reference integrated feature 1001 is labeled (in the leftmost column) for convenience of description. However, such a name does not actually need to be contained in the integrated feature dictionary 1000.

Here, the reference integrated feature 1001 is data for use by the classification unit 208 for comparing with the integrated feature 901 of the audio signal. The reference integrated feature 1001 has a structure equivalent to that of the integrated feature 901. The reference integrated feature 1001 is represented as a 100-dimensional vector, as well as the integrated feature 901.

Also, the category ID 1002 is an ID for identifying the reference integrated features 1001. The category IDs 1002 are in one-to-one correspondence with the reference integrated features 1001.

The reference integrated features 1001 and the category IDs 1002 are in one-to-one correspondence with categories that are classification destinations.

In the example shown in FIG. 10, the integrated feature dictionary 1000 contains one hundred reference integrated features 1001 such as "party" and "meeting" each having a different one of the category IDs 1002 "C001"-"C100". For example, a reference integrated feature 1001 of "party" is data created from an audio signal in which audio of a party is recorded.

The integrated feature dictionary 1000 has been created in advance, and is stored in the reference integrated feature storage unit 207. The integrated feature dictionary 1000 is never modified.

The classification unit 208 has a function of classifying the audio signal based on the integrated feature 901 extracted from the audio signal by the integrated feature extraction unit 206. Specifically, the classification unit 208 compares the integrated feature 901 of the audio signal with each of the reference integrated features 1001 stored in the reference integrated feature storage unit 207 to calculate a similarity. Then, the classification unit 208 classifies the audio signal into a category corresponding to a reference integrated feature having the highest similarity. Hereinafter, the similarity between the integrated feature 901 and the reference integrated feature 1001 is referred to as "integrated similarity".

Furthermore, the classification unit 208 stores, in the classification information storage unit 105, a file containing the audio signal that is the classification target and a category ID 1002 identifying the category resulting from the classification in correspondence with each other.

<1-3. Operations>

The following describes operations of the video recording device 100 in detail.

The video recording device 100 basically performs two processing of moving image recording processing and moving image display processing. Also, the moving image recording processing includes audio classification processing.

The moving image recording processing is processing of acquiring moving images from the recording medium 110, storing the acquired moving images in the video recording device 100, and classifying the moving images. The moving image recording processing is performed in response to reception of a user operation instructing to record a moving image stored in the recording medium 110 into the video recording device 100 while the recording medium 110 is attached to the video recording device 100.

The audio classification processing is processing of classifying audio extracted from a moving image so as to classify the moving image. A classification result of the audio is used for classifying the moving image without modification.

The moving image display processing is processing of displaying a moving image based on a result of audio classification processing. The moving image display processing is performed in response to reception of a user operation instructing to display a moving image.

<1-3-1. Moving Image Recording Processing>

Figure 12:
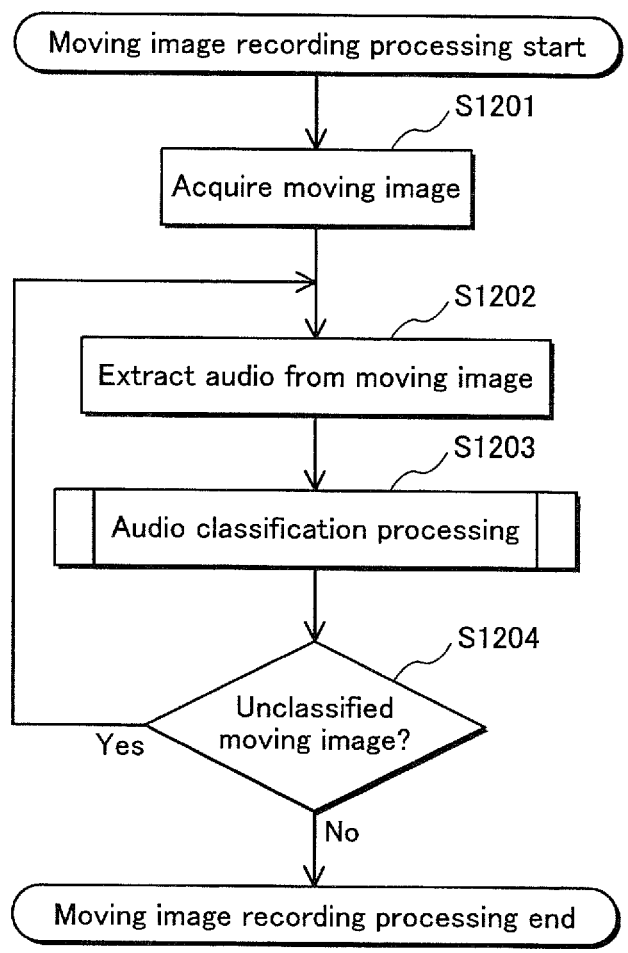
FIG. 12 is a flow chart showing moving image recording processing.

The following describes the moving image recording processing with reference to a flow chart shown in FIG. 12.

Firstly, the input unit 101 acquires one or more files of moving images which the user instructs to acquire from the recording medium 110, and stores the acquired files of moving images in the content storage unit 102 (Step S1201).

Next, the audio extraction unit 103 acquires one unclassified moving image from a file group of moving images stored in the content storage unit 102, and extracts an audio signal from the acquired unclassified moving image (Step S1202). Here, the unclassified moving image indicates a moving image whose classification result has not yet been stored in the classification information storage unit 105. Every moving image to be acquired in Step S1202 is an unclassified moving image.

Then, the audio classification unit 104 performs audio classification processing on the audio signal extracted by the audio extraction unit 103 (Step S1203). In this audio classification processing, the audio classification unit 104 stores a classification result of the acquired moving image in the classification information storage unit 105.

After the audio classification processing completes, the audio classification unit 104 judges whether the file group of moving images stored in the content storage unit 102 includes an unclassified moving image (Step S1204).

If the file group of moving images does not include any unclassified moving image (Step S1204: No), that is, if all the moving images included in the file group of moving images have already been classified, the moving image recording processing ends. If the file group of moving images includes an unclassified moving image (Step S1204: Yes), the flow returns to Step S1202.

<1-3-2. Audio classification Processing>

Figure 13:
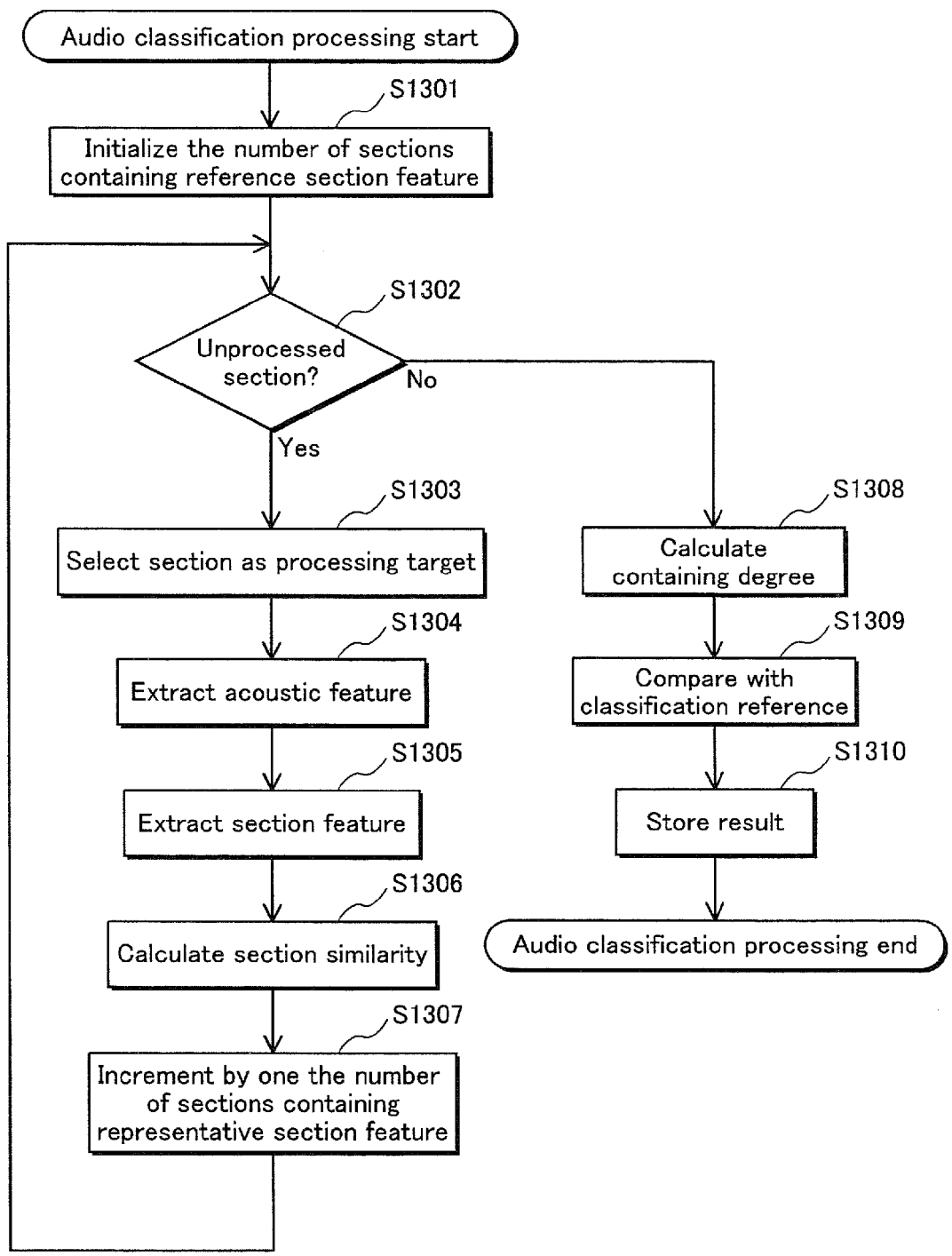
FIG. 13 is a flow chart showing audio classification processing.

The following describes audio classification processing on one audio signal extracted from one moving image, with reference to a flow chart shown in FIG. 13. Here, an audio signal that is a classification target is called "audio signal A".

In this processing, a section similarity is calculated with each of all the short time sections contained in the audio signal A. Based on a result of the calculation, an integrated feature 901 of the audio signal A is extracted to classify the audio signal A.

Firstly, the number of sections containing each reference section feature is cleared to zero (Step S1301).

Here, the number of sections containing each reference section feature indicates the number of short time sections where the reference section feature is a representative section feature among short time sections on which the current audio classification processing has been performed. The number of sections containing the reference section feature is used for calculating the containing degree.

Next, judgment is made as to whether the audio signal A contains any unprocessed short time section on which processing has not been yet performed since the current audio classification processing has started (Step S1302).

If the audio signal A contains one or more unprocessed short time sections (Step S1302: Yes), one of the unprocessed short time sections is selected as a processing target (Step S1303). Hereinafter, a short time section selected in Step 1303 is called "short time section S".

Here, sections selected as the short time section S are in ascending order from the first section of 10 ms of the audio signal A. For example, in the first processing of Step S1303 in the current audio classification processing, a section of 0-10 ms is selected, and in the second processing of Step S1303, a section of 10-20 ms is selected.

The acoustic feature extraction unit 201 extracts the acoustic feature 301 from the short time section S (Step S1304). Here, the acoustic feature 301 is extracted by calculation of MFCC with respect to the short time section S.

FIG. 3 shows the example where the processing of Step 1304 is in progress and completed with respect to up to the section of 1000-1010 ms.

The section feature extraction unit 203 calculates an acoustic similarity between the acoustic feature 301 of the short time section S and each of the reference acoustic features 401 contained in the acoustic feature dictionary 400 stored in the reference acoustic feature storage unit 202, thereby to extract the section feature 501 of the short time section S (Step S1305).

The acoustic similarity is calculated by a method using a Euclidean distance between a vector representing the acoustic feature 301 and a vector representing the reference acoustic feature 401. For example, the acoustic similarity is calculated based on the Gaussian function using the Euclidean distance as a variable.

FIG. 5 shows the example where the processing of Step 1305 is in progress and completed with respect to up to the section of 1000-1010 ms.

The section similarity calculation unit 205 calculates a section similarity between the section feature 501 of the short time section S and each of the reference section features 601 contained in the section feature dictionary 600 stored in the reference section feature storage unit 204 (Step S1306).

The section similarity is calculated by a method using a Euclidean distance between a vector representing the section feature 501 and a vector representing the reference section feature 601. For example, the section similarity is calculated based on the Gaussian function using the Euclidean distance as a variable.

FIG. 7 shows the example where the processing of Step 1306 is in progress and completed with respect to up to the section of 1000-1010 ms.

Then, a reference section feature having the highest section similarity with the section feature 501 of the short time section S is selected as a representative section feature of the short time section S. If a plurality of reference section features have the highest section similarity, one of the plurality of reference section features (that is identified by a feature ID 602 having a lower number, for example) is selected in accordance with a predetermined condition.

FIG. 8 shows the example where the processing of Step 1307 is in progress and completed with respect to up to the section of 1000-1010 ms.

The integrated feature extraction unit 206 increments by one the number of sections containing the reference section feature that is the representative section feature selected by the section similarity calculation unit 205 (Step S1307).

After Step S1307 completes, the flow returns to Step S1302 to perform processing on a subsequent short time section.

In Step S1302, if the audio signal A does not contain any unprocessed section (Step S1302: No), that is, if processing completes with respect to each of all the sections, the following processing is performed.

Firstly, the integrated feature extraction unit 206 calculates a containing degree of each of the reference section features in the audio signal A, thereby to extract the integrated feature 901 of the audio signal A (Step S1308). Here, the containing degree is calculated as a value resulting from division of the number of sections containing the reference section feature by the total number of short time sections of the audio signal A.

FIG. 9 shows an example of a result of the integrated feature 901 extracted in Step 1308.

Next, the classification unit 208 calculates an integrated similarity between the integrated feature 901 extracted by the integrated feature extraction unit 206 and each of the reference integrated features 1001 contained in the integrated feature dictionary 1000 stored in the reference integrated feature storage unit 207, thereby to classify the audio signal A into a category corresponding to a reference integrated feature having the highest integrated similarity (Step S1309). If a plurality of reference integrated features have the highest section similarity, one of the plurality of reference section features (that is identified by a category ID 1002 having a lower number, for example) is selected in accordance with a predetermined condition. Then, the audio signal A is classified into a category corresponding to the selected reference integrated feature.

Figure 11:
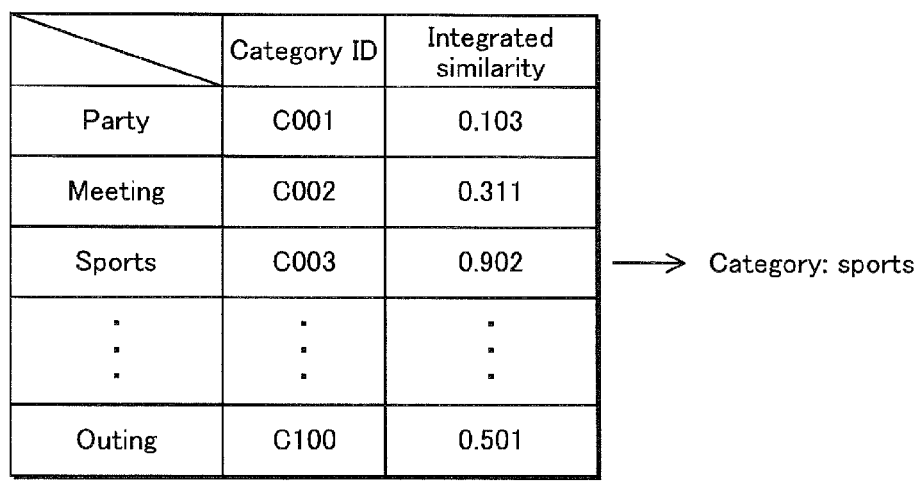
FIG. 11 shows an example of an integrated similarity for each category and a classification result.

FIG. 11 shows an example of a calculation result of the integrated similarity and a classification result performed in Step 1309.

Lastly, the classification unit 208 stores, in the classification information storage unit 105, a file name of a file of the moving image containing the audio signal A and the category ID of the category into which the audio signal A is classified in correspondence with each other. (Step S1310).

<1-3-3. Moving Image Display Processing>

Figure 14:
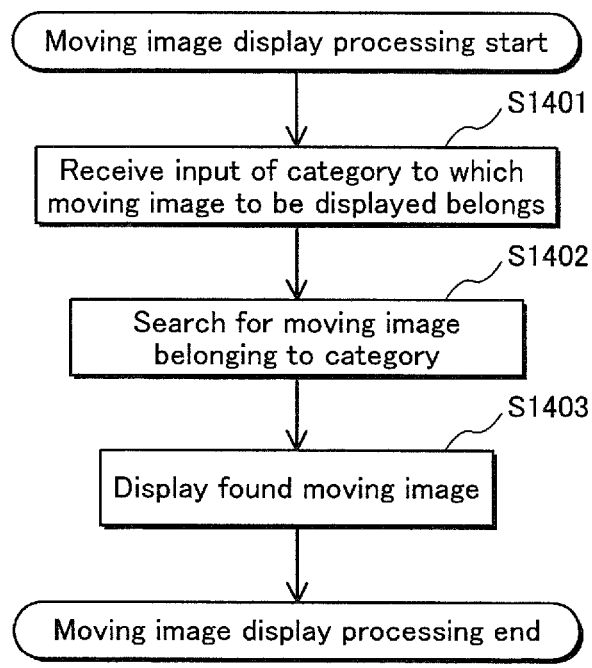
FIG. 14 is a flow chart showing moving image display processing.

The following describes moving image display processing with reference to a flow chart shown in FIG. 14.

In response to reception of a user operation instructing to display a moving image, the output unit 106 causes the display device 120 to display a screen that prompts the user to input a category to which the moving image the user wants to display belongs, and the operation unit 107 receives the user's input (Step S1401). Here, the user inputs the category by selecting the category from among a category list displayed by the display device 120.

When the category to which the moving image the user wants to display belongs is input by the user, a file belonging to the category is searched for among data stored in the classification information storage unit 105, based on a category ID corresponding to the category (Step S1402).

As a result of searching, the output unit 106 outputs a moving image contained in the found file belonging to the selected category, and causes the display device 120 to play back the moving image (Step S1403).

2. Embodiment 2

The following describes, as an embodiment 2 of the present invention, a video recording device 100a that is a modification of the video recording device 100 relating to the embodiment 1. The video recording device 100a itself generates the acoustic feature dictionary 400, the section feature dictionary 600, and the integrated feature dictionary 1000.

Note that the acoustic feature dictionary 400, the section feature dictionary 600, and the integrated feature dictionary 1000 are hereinafter collectively referred to as "reference data".

<2-1. Outline>

In the embodiment 1, reference data has been created in advance, and the video recording device 100 itself neither creates nor modifies the reference data.

In the embodiment 2, the video recording device 100*a* creates reference data with use of audio signals contained in moving images input by the user.

This allows classification more suitably for the tendency of moving images recorded by the user.

<2-2. Structure>

Figure 15:
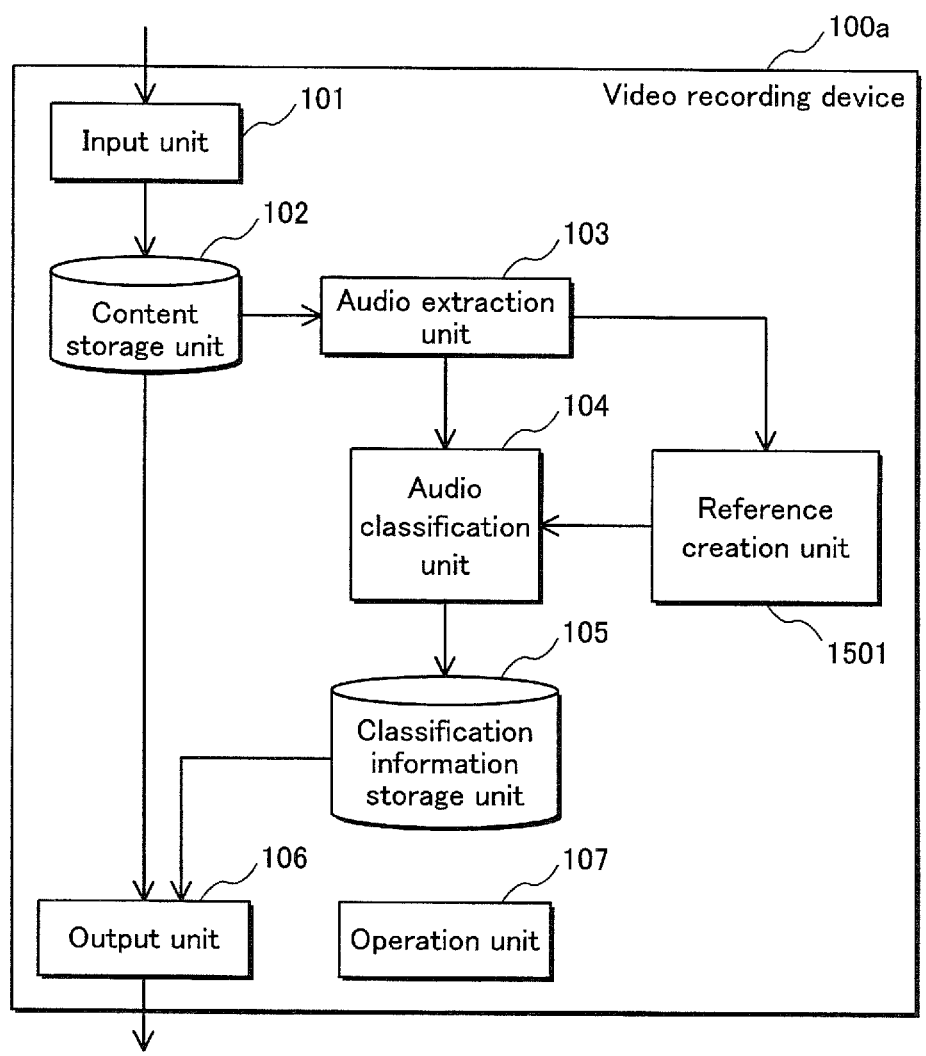
FIG. 15 shows the functional structure of a video recording device relating to an embodiment 2.

As shown in the functional structure in FIG. 15, the video recording device 100*a* includes a reference creation unit 1501 in addition to the structural elements of the video recording device 100. The structural elements of the video recording device 100*a* are equivalent to those of the video recording device 100, excepting the reference creation unit 1501.

The reference creation unit 1501 has a function of creating reference data from audio signals contained in moving images stored in the content storage unit 102. The reference creation unit 1501 stores the created reference data in the reference acoustic feature storage unit 202, the reference section feature storage unit 204, and the reference integrated feature storage unit 207 included in the audio classification unit 104.

The following describes the reference creation unit 1501 in further detail.

Figure 16:
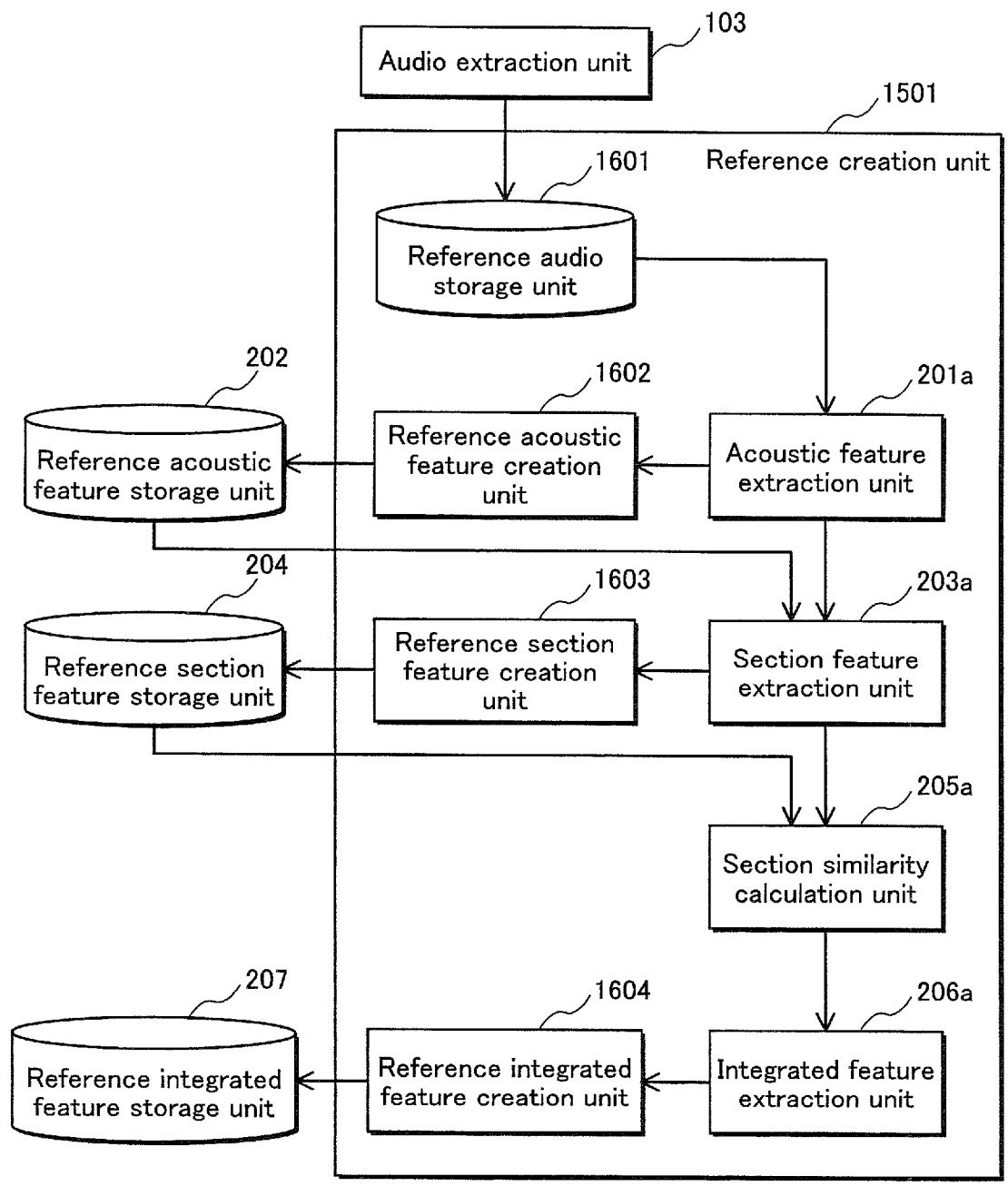
FIG. 16 shows the functional structure of a reference creation unit.

FIG. 16 shows the functional structure of the reference creation unit 1501.

As shown in FIG. 16, the reference creation unit 1501 includes a reference audio storage unit 1601, an acoustic feature extraction unit 201*a*, a section feature extraction unit 203*a*, a section similarity calculation unit 205*a*, an integrated feature extraction unit 206*a*, a reference acoustic feature creation unit 1602, a reference section feature creation unit 1603, and a reference integrated feature creation unit 1604.

The acoustic feature extraction unit 201*a*, the section feature extraction unit 203*a*, the section similarity calculation unit 205*a*, the integrated feature extraction unit 206*a*, the reference acoustic feature creation unit 1602, the reference section feature creation unit 1603, and the reference integrated feature creation unit 1604 are realized by the processor executing programs stored in the memory.

The reference audio storage unit 1601 is a region of the memory for storing therein a plurality of audio signals for use in creating reference data.

The reference audio storage unit 1601 stores therein in advance a plurality of audio signals for use in creating default reference data which has not yet been used by the user. The number of audio signals stored in advance is equal to or larger than the number of reference integrated features to be created by the reference integrated feature creation unit 1604.

When the user inputs a moving image to the video recording device 100*a*, the reference audio storage unit 1601 further stores therein an audio signal contained in the input moving image.

Except for performing processing based on the audio signals stored in the reference audio storage unit 1601, the acoustic feature extraction unit 201*a*, the section feature extraction unit 203*a*, the section similarity calculation unit 205*a*, and the integrated feature extraction unit 206*a* have the same functions of the acoustic feature extraction unit 201, the section feature extraction unit 203, the section similarity calculation unit 205, and the integrated feature extraction unit 206 included in the audio classification unit 104, respectively.

The reference acoustic feature creation unit 1602 has a function of creating the acoustic feature dictionary 400 from a result of acoustic features extracted by the acoustic feature extraction unit 201*a*. The created acoustic feature dictionary 400 is stored in the reference acoustic feature storage unit 202 included in the audio classification unit 104.

The reference section feature creation unit 1603 has a function of creating the section feature dictionary 600 from a result of section features extracted by the section feature extraction unit 203*a*. The created section feature dictionary 600 is stored in the reference section feature storage unit 204 included in the audio classification unit 104.

The reference integrated feature creation unit 1604 has a function of creating the integrated feature dictionary 1000 from a result of integrated features extracted by the integrated feature extraction unit 206*a*. The created integrated feature dictionary 1000 is stored in the reference integrated feature storage unit 207 included in the audio classification unit 104.

<2-3. Operations>

The following describes operations of the video recording device 100*a*. With respect to operations of the video recording device 100*a* that are the same as those of the video recording device 100 relating to the embodiment 1, description thereof is omitted.

The video recording device 100*a* performs the operations whose moving image recording processing is partially modified from those of the video recording device 100, and additionally includes reference creation processing.

<2-3-1. Moving Image Recording Processing>

Moving image recording processing (FIG. 12) is modified as follows.

In the embodiment 1, when a moving image is acquired (Step S1201), the acquired moving image is stored in the content storage unit 102. In the embodiment 2, furthermore, an audio signal is extracted from the moving image, and then the extracted audio signal is stored in the reference audio storage unit 1601 included in the reference creation unit 1501.

<2-3-2. Reference Creation Processing>

Reference creation processing is processing of creating reference data.

Reference creation processing is performed when the operation unit 107 receives a user operation instructing to create reference data.

Figure 17:
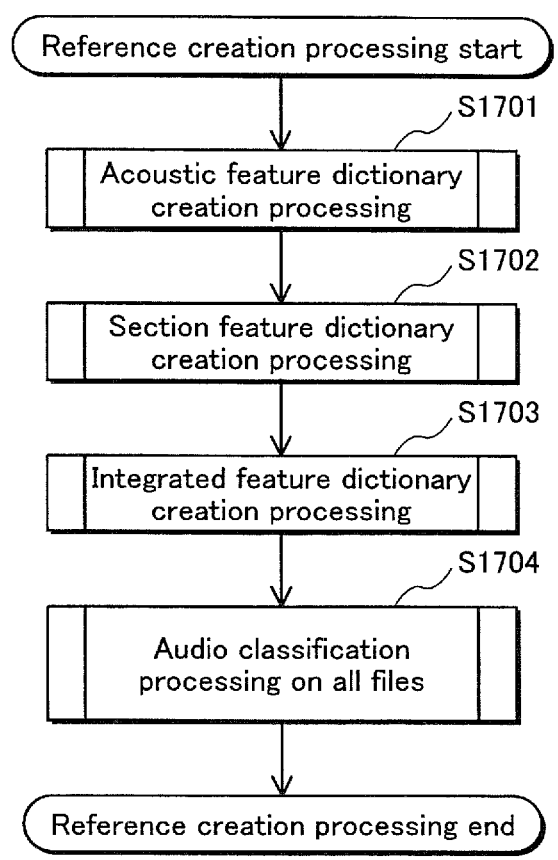
FIG. 17 is a flow chart showing reference creation processing.

The following describes reference creation processing with reference to a flow chart shown in FIG. 17.

The reference acoustic feature creation unit 1602 performs acoustic feature dictionary creation processing of creating an acoustic feature dictionary 400 and storing the created acoustic feature dictionary 400 in the reference acoustic feature storage unit 202 (Step S1701).

The reference section feature creation unit 1603 performs section feature dictionary creation processing of creating a section feature dictionary 600 and storing the created section feature dictionary 600 in the reference section feature storage unit 204 (Step S1702).

The reference integrated feature creation unit 1604 performs integrated feature dictionary creation processing of creating an integrated feature dictionary 1000 and storing the created integrated feature dictionary 1000 in the reference integrated feature storage unit 207 (Step S1703).

Then, the audio extraction unit 103 extracts an audio signal for each of all the files of moving image stored in the content storage unit 102, and the audio classification unit 104 performs audio classification processing for each of all the files of moving image (Step S1704).

<2-3-3. Acoustic Feature Dictionary Creation Processing>

Acoustic feature dictionary creation processing is part of the above reference creation processing.

Figure 18:
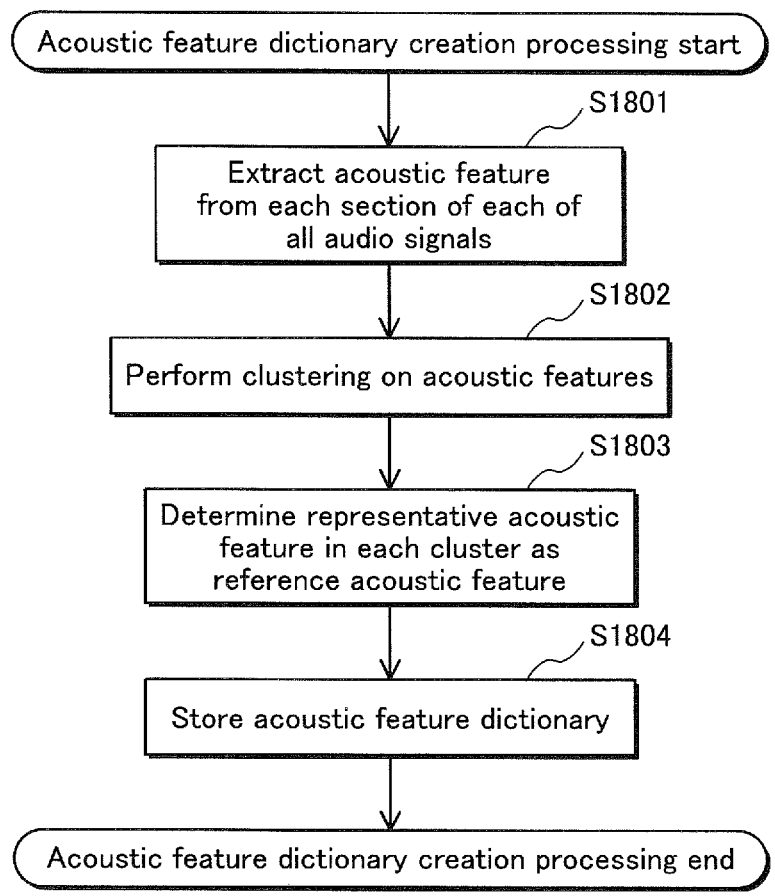
FIG. 18 is a flow chart showing acoustic feature dictionary creation processing.

The following describes the acoustic feature dictionary creation processing with reference to a flow chart shown in FIG. 18.

Firstly, the acoustic feature extraction unit 201a extracts an acoustic feature with respect to each of all the short time sections of each of all the audio signals stored in the reference audio storage unit 1601 (Step S1801).

Next, the acoustic feature extraction unit 201a performs clustering on all the extracted acoustic features as classification targets (Step S1802).

Clustering is a method of classifying each piece of enormous amounts of data into a data group called "cluster". Here, the k-means method is used for clustering.

According to the k-means method, the number of clusters k to be generated is determined beforehand (to be 100, for example), and k clusters are automatically generated from enormous amounts of data that is classification target (acoustic features, here). Then, each piece of all the data that is the classification target is classified into any one of the k clusters.

Then, the acoustic feature extraction unit 201a creates an acoustic feature dictionary 400 based on a result of clustering performed on the acoustic features (Step S1803).

Here, a mean value of acoustic features belonging to each cluster is determined as a reference acoustic feature 401, and k reference acoustic features 401 are calculated. Then, the calculated k reference acoustic features 401 are in one-to-one correspondence with acoustic IDs 402, thereby creating the acoustic feature dictionary 400 containing the k reference acoustic features 401.

Each cluster corresponds to an acoustic ID 402 composed of a combination of a character "A" and a three-digit serial number starting with a number "A001" in an order of cluster creation since the current acoustic feature dictionary creation processing has started. For example, a cluster created by the 25th corresponds to an acoustic ID 402 "A025", and a reference acoustic feature 401 calculated from this cluster corresponds to the acoustic ID 402 "A025".

Lastly, the newly created acoustic feature dictionary 400 is stored in the reference acoustic feature storage unit 202 (Step S1804). Here, in the case where an acoustic feature dictionary 400 has already been stored in the reference acoustic feature storage unit 202, the stored acoustic feature dictionary 400 is overwritten with the newly created acoustic feature dictionary 400.

<2-3-4. Section Feature Dictionary Creation Processing>

Section feature dictionary creation processing is part of the above reference creation processing.

Figure 19:
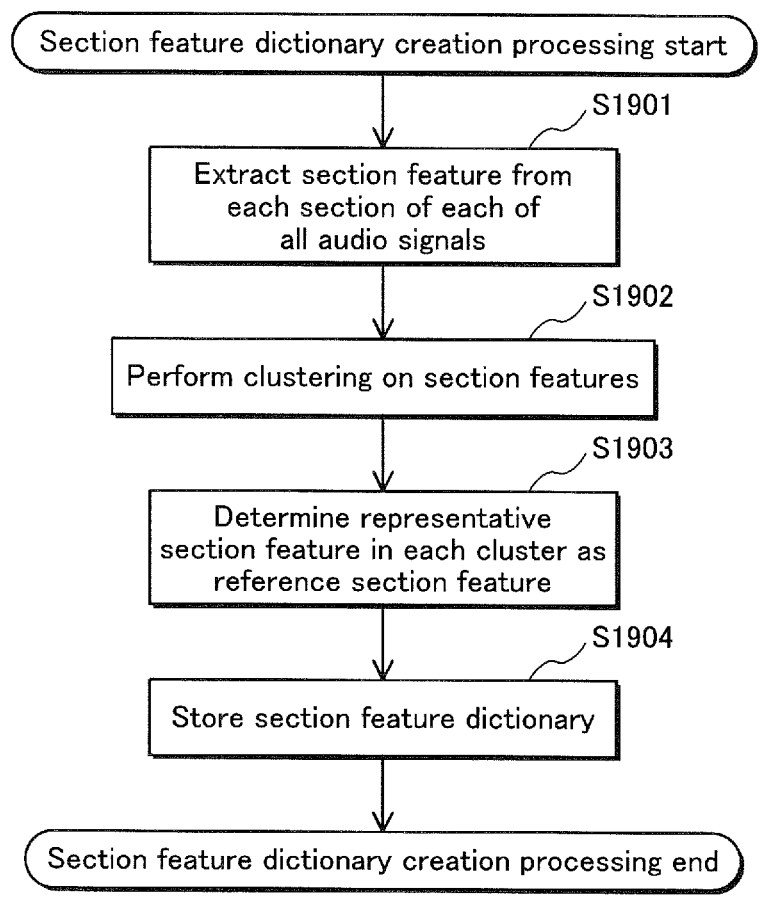
FIG. 19 is a flow chart showing section feature dictionary creation processing.

The following describes the section feature dictionary creation processing with reference to a flow chart shown in FIG. 19.

Firstly, the section feature extraction unit 203a extracts a section feature with respect to each of all the short time sections of each of all the audio signals stored in the reference audio storage unit 1601 (Step S1901).

The section feature is extracted with respect to each short time section, with use of the acoustic features extracted by the acoustic feature extraction unit 201a and the acoustic feature dictionary 400 created in the above acoustic feature dictionary creation processing.

Next, the section feature extraction unit 203a performs clustering on all the extracted section features as classification targets (Step S1902). Here, the k-means method is used for clustering, with use of the number of clusters k=100.

The section feature extraction unit 203a creates a section feature dictionary 600 based on a result of clustering performed on the section features (Step S1903).

Here, a mean value of section features belonging to each cluster is determined as a reference section feature 601, and k reference section features 601 are calculated. Then, the calculated k reference section features 601 are in one-to-one correspondence with feature IDs 602, thereby creating the section feature dictionary 600 containing the k reference section features 601.

Each cluster corresponds to a feature ID 602 composed of a combination of a character "F" and three-digit serial number starting with a number "F001" in an order of cluster creation since the current section feature dictionary creation processing has started. For example, a cluster by the 50th corresponds to a feature ID 602 "A050", and a reference section feature 601 calculated from this cluster corresponds to the acoustic ID 602 "A050".

Lastly, the newly created section feature dictionary 600 is stored in the reference section feature storage unit 204 (Step S1904). Here, in the case where a section feature dictionary 600 has already been stored in the reference section feature storage unit 204, the stored section feature dictionary 600 is overwritten with the newly created section feature dictionary 600.

<2-3-5. Integrated Feature Dictionary Creation Processing>

Integrated feature dictionary creation processing is part of the above reference creation processing.

Figure 20:
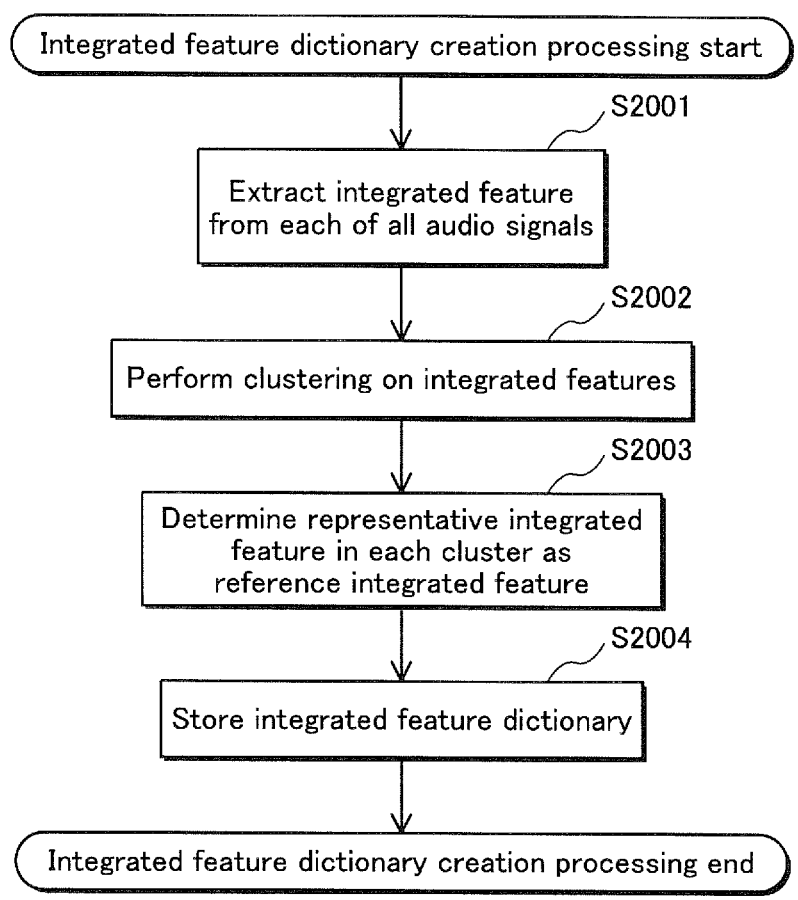
FIG. 20 is a flow chart showing integrated feature dictionary creation processing.

The following describes the integrated feature dictionary creation processing with reference to a flow chart shown in FIG. 20.

Firstly, the integrated feature extraction unit 206a extracts an integrated feature of each of all the audio signals stored in the reference audio storage unit 1601 (Step S2001).

The integrated feature of each audio signal is extracted, with use of the section similarity calculated by the section similarity calculation unit 205a with respect to each short time section contained in each of the audio signals.

Also, the section similarity calculation unit 205a calculates a section similarity with respect to each short time section, with use of the section features extracted by the section feature extraction unit 203a and the section feature dictionary 600 created in the above section feature dictionary creation processing.

Next, the section similarity calculation unit 205a performs clustering on all the extracted integrated features as classification targets (Step S2002). Here, the k-means method is used for clustering, with use of the number of clusters k=100.

Then, the section similarity calculation unit 205a creates an integrated feature dictionary 1000 based on a result of clustering performed on the integrated features (Step S2003).

Here, a mean value of integrated features belonging to each cluster is determined as a reference integrated feature 1001, and k reference integrated features 1001 are calculated. Then, the calculated k reference integrated features 1001 are in one-to-one correspondence with category IDs 1002, thereby creating the integrated feature dictionary 1000 containing the k reference integrated features 1001.

Each cluster corresponds to a classification ID 1002 composed of a combination of a character "C" and three-digit serial number starting with a number "C001" in an order of cluster creation since the current integrated feature dictionary creation processing has started. For example, a cluster created by the 75th corresponds to a category ID 1002 "C075", and a reference integrated feature 1001 calculated from this cluster corresponds to the category ID 1002 "C075".

Lastly, the newly created integrated feature dictionary 1000 is stored in the reference integrated feature storage unit 207 (Step S1904). Here, in the case where an integrated feature dictionary 1000 has already been stored in the reference integrated feature storage unit 207, the stored integrated feature dictionary 1000 is overwritten with the newly created integrated feature dictionary 1000.

<Supplementary Description>

Although the audio classification device relating to the present invention has been described based on the embodiments, the present invention is not of course limited to the audio classification device as described in the above embodiments.

(1) A control program composed of a program code may cause the processor of the audio classification device, as well as a variety of circuits connected to the processor, to perform audio classification processing and so on (see FIG. 6 to FIG. 9) described in the embodiments. The control program may be recorded in a recording medium or distributed via a variety of communication channels. Such a recording medium includes an IC card, a hard disk, an optical disc, a flexible disk, a ROM, and the like. The distributed control program is usable by being stored on, for example, a memory readable by a processor. The various functions described in the embodiments are realized by the processor executing the control program. Note that part of the control program may be executed by a program executable device (processor), which is separate from the audio classification device, by transmitting the part of the control program to the separate program executable device via various networks.

(2) Part or all of the structural elements of the audio classification device may be implemented as one or more integrated circuits (such as ICs and LSIs). Alternatively, these structural elements of the audio classification device may be formed into an integrated circuit (integrated into one chip) by further including other element.

(3) In the embodiments 1 and 2, the audio classification device has been described as a structural element of the video recording device. Alternatively, the audio classification device may be a structural element of an audio recording device. Further alternatively, the audio classification device may be an audio classification device that acquires an audio signal from an external device and outputs a category name or the like of a classification result. In other words, the audio classification device only needs to be a device that classifies an audio signal.

(4) In the embodiments 1 and 2, a file group of moving images is acquired from a recording medium. However, the acquisition means is not limited to the method using a recording medium. Alternatively, the file group of moving images may be acquired from a wireless or a wire broadcasting, a network, or the like. Further alternatively, the audio classification device may include a recording device such as a microphone, and acquire an audio signal recorded by the recording device.

(5) In the embodiments 1 and 2, the section feature extraction unit extracts the section feature based on the acoustic features extracted by the acoustic feature extraction unit and the acoustic feature dictionary stored in the reference acoustic feature storage unit. However, the present invention is not limited to this as long as a feature relating to a frequency distribution is extracted.

For example, the following structure may be employed in which the acoustic feature extraction unit and the reference acoustic feature storage unit are omitted, and the section feature extraction unit extracts a feature equivalent to the acoustic feature, as the section feature. In this case, the section feature dictionary stored in the reference section feature storage unit contains data equivalent to that of the acoustic feature dictionary.

(6) In the embodiments 1 and 2, the following storage units are each realized by a memory: the content storage unit, the classification information storage unit, the reference acoustic feature storage unit, the reference section feature storage unit, and the reference integrated feature storage unit. However, the present invention is not limited to have this structure as long as the audio classification device is a readable and writable storage device. For example, these storage units each may be realized by a hard disk, a flexible disc, or the like. Alternatively, these storage units each may be not a storage device built in the audio classification device but an external storage device.

(7) In the embodiments 1 and 2, a video is output to the display device. However, the present invention is not limited to this output target and this output destination. For example, the following structure may be employed in which a file of moving image has added thereto metadata indicating a classification result of the moving image, and the file is output to an external storage device. In other words, it is only necessary to perform output based on a classification result.

(8) In the embodiments 1 and 2, the operation unit receives a user operation via the push-button or the like. However, the present invention is not limited to have this structure as long as the operation unit performs various processing in response to some trigger. For example, the operation unit may receive a user operation via a remote control. Alternatively, the operation unit may detect that the recording medium is attached to the audio classification device without any user operation, and automatically perform various processing.

(9) In the embodiments 1 and 2, the MFCC is used for representing the acoustic feature. However, the acoustic feature does not necessarily need to be limited to be represented using the MFCC as long as a feature relating to a frequency can be extracted from each short time section contained in an audio signal. For example, the acoustic feature may be a feature indicating a frequency spectrum in each short time section.

(10) In the embodiments 1 and 2, a classification result is stored in the classification information storage unit. Alternatively, the following structure may be employed in which the classification result is stored in the content storage unit in correspondence with a file of moving image that is a classification target by containing the classification result in metadata of the file.

Also, instead of the category ID, a character string representing a category name corresponding to each category may be employed.

(11) In the embodiment 1, the acoustic feature dictionary, the section feature dictionary, and the integrated feature dictionary each have been determined in advance, and are never modified. Alternatively, the data each may be modified. For example, the data may be updated by being downloaded via the network.

(12) In the embodiments 1 and 2, in order to calculate the containing degree, the number of sections containing each reference section feature is calculated, and the calculated number of containing sections is divided by the number of sections contained in an audio signal that is a processing target (the total number of sections). Alternatively, other method may be employed for calculating the containing degree.

For example, it may be possible to replace the processing of incrementing the number of containing sections by one (Step S1307 in FIG. 13) with processing of incrementing the number of containing sections by a reciprocal of the total number of sections (1/the total number of sections), and omit the processing of Step S1308. According to this method, at the time of completion of the processing of Step S1307 with respect to all the sections contained in the audio signal that is the processing target, the containing degree is equivalent to a proportion of the number of containing sections to the total number of sections.

Furthermore, the containing degree of each reference section feature does not necessarily need to be limited to be a value resulting from division of the number of sections containing the reference section feature as a representative section feature by the total number of short time sections contained in an audio signal that is a processing target, as long as the containing degree indicates how much of a section, in which the reference section feature is the representative section feature, is contained in the audio signal. For example, the containing degree may be a value resulting from weighting the proportion of the number of sections containing each reference section feature to the number of all the sections.

As a weight method, the following method may be employed in which an IDF (Inverse Document Frequency) is calculated with respect to each reference section feature, and each proportion is weighted by the calculated IDF, thereby obtaining a containing degree as a TF-IDF (Term Frequency-Inverse Document Frequency).

(13) In the embodiments 1 and 2, the description has been provided with respect to the case where short time sections contained in an audio signal are successive. Alternatively, the short time sections may partially overlap each other. Further alternatively, the short time sections may include a short time section therebetween, which is not used for detecting a section feature.

The following structure may be employed, for example, in which each two of the short time sections overlap each other by 2 ms, such that short time sections of 0-10 ms, 8-18 ms, 16-26 ms, and 24-34 ms . . . are obtained.

Alternatively, the following structure may be employed, for example, in which each two of the short time sections have a blank section of 20 ms therebetween, such that short time sections of 0-10 ms, 30-40 ms, 60-70 ms . . . are obtained.

(14) In the embodiment 2, the reference acoustic feature creation unit, the reference section feature creation unit, and the reference integrated feature creation unit use the same audio signals stored in the reference audio storage unit for creating reference data. Alternatively, different audio signals may be used for creating reference data.

For example, audio signals for use by the reference acoustic feature creation unit may be audio signals in which a sound generated by a single sound source is recorded such as a sound of "whistle" and "speech". Also, audio signals for use by the reference section feature creation unit and the reference integrated feature creation unit may be audio signals in which audio, which is a mixture of sounds generated by various sound resources, is recorded such as audio of "party" and "meeting".

Also, the user may select audio signals for use by each of the reference acoustic feature creation unit, the reference section feature creation unit, and the reference integrated feature creation unit.

(15) In the embodiment 2, the reference acoustic feature creation unit, the reference section feature creation unit, and the reference integrated feature creation unit each create one hundred pieces of reference data. Alternatively, these units may create pieces of reference data whose number is other than one hundred. Further alternatively, these creation units each may create a different number of pieces of reference data. Yet alternatively, the number of pieces of reference data to be created may not be determined in advance, and these creation units each may dynamically determine the number of pieces of reference data to be created.

(16) In the embodiment 2, the reference audio storage unit stores therein in advance audio signals for use in creating reference data. However, the reference audio storage unit does not necessarily need to store therein in advance such audio signals. For example, the reference audio storage unit may store therein only an audio signal, which has been extracted from a moving image input by the user.

(17) In the embodiment 2, the k-means method is used as a clustering method. Alternatively, other clustering method may be employed such as the Ward method.

(18) In the embodiments 1 and 2, the acoustic similarity is calculated based on the Gaussian function using the Euclidean distance between the acoustic feature and the reference acoustic feature as a variable. Alternatively, the acoustic similarity may be represented by other value as long as the value represents the correlation between the acoustic feature and the reference acoustic feature.

For example, the Euclidean distance between the acoustic feature and the reference acoustic feature may be employed as the acoustic similarity without modification. In this case, the lower value the acoustic similarity is, the higher degree the higher the acoustic similarity is.

Similarly, the section similarity does not necessarily need to be calculated based on the Gaussian function using the Euclidean distance between the section feature and the reference section feature as a variable.

Furthermore, the integrated similarity does not necessarily need to be calculated based on the Gaussian function using the Euclidean distance between the integrated feature and the reference integrated feature as a variable.

(19) In the embodiments 1 and 2, the reference acoustic feature has the structure equivalent to that of the acoustic feature. However, the reference acoustic feature does not necessarily need to have the equivalent structure as long as the structure of the reference acoustic feature can be compared with the structure of the acoustic feature. In the case where the structure of the reference acoustic feature is modified, the calculation method of the acoustic similarity is modified in accordance with the modified reference acoustic feature.

For example, the reference acoustic feature may be calculated from a vector having 26-dimensional components of M01-M26, which is equivalent to the structure of the acoustic feature, and the variance of the Gaussian function, and the acoustic similarity may be calculated based on the Gaussian function using the Euclidean distance and the variance.

Also, the reference acoustic feature may have a plurality of pairs each composed of a vector and a variance such as described above, and the acoustic similarity may be calculated by the GMM (Gaussian Mixture Model).

(20) In the embodiment 1, the reference acoustic feature has been described taking, as an example, data created from audio signals in which a sound of "shout of joy", "whistle", and so on is recorded. Alternatively, the reference acoustic feature may be created by any method as long as the reference acoustic feature is data that can be compared with the acoustic feature.

For example, a "supervised" method may be employed as described in the embodiment 1. According to this method, audio signals which have been classified into categories in advance are collected, and a reference acoustic feature is created for each category. Specifically, audio signals, each in which a sound of shout of joy is recorded, are collected, and a reference acoustic feature of "shout of joy" is created from these audio signals, for example.

Alternatively, an "unsupervised" method may be employed as described in the embodiment 2. According to this method, audio signals which have not been classified in advance are collected and automatically classified into categories by clustering or the like, and then a reference acoustic feature is created for each category.

Similarly, the reference section feature and the reference integrated feature each may be created by any method. Either the "supervised" method or the "unsupervised" method may be employed.

(21) The following further describes the structure of an audio classification device relating to an embodiment of the present invention, modifications, and effects thereof.

(a) An audio classification device relating to one embodiment of the present invention comprises: an acquisition unit operable to acquire an audio signal; a section feature extraction unit operable, with respect to each of a plurality of sections each having a predetermined length contained in the audio signal, to extract a section feature relating to an audio frequency distribution; a reference section feature storage unit that stores therein a plurality of reference section features that are each a reference for a comparison with each of the extracted section features; a calculation unit operable, with respect to each of the plurality of sections, to make a comparison between the section feature and each of the reference section features to calculate a section similarity indicating a degree of correlation between the section feature and each of the reference section features; an integrated feature extraction unit operable to extract, from the audio signal, an integrated feature relating to the plurality of sections, the integrated feature being calculated based on the section similarity calculated with respect to each of the plurality of sections; a reference integrated feature storage unit that stores therein one or more reference integrated features that are each a reference for a comparison with the integrated feature; and a classification unit operable to make a comparison between the integrated feature with each of the one or more reference integrated features, and classify the audio signal based on a result of the comparison.

According to the audio classification device having the above structure, the section similarity is calculated, which indicates how much and what type of sound each of the plurality of sections contained in the audio signal has a correlation with, and the integrated feature is extracted based on the section similarity calculated with respect to each of the plurality of sections. Then, the audio signal is classified by comparing the integrated feature with each of the one or more reference integrated features that are classification reference data. The features relating to the plurality of sections are integrated for use in classification in this way. Accordingly, it is possible to appropriately classify audio composed of a mixture of various sounds.

(b) In the audio classification device described in the section (a), the integrated feature extraction unit may calculate, for each of the reference section features, a containing degree indicating how much of a section, in which the reference section feature has a higher section similarity than any other of the reference section features, is contained in the audio signal, and extract, as the integrated feature, the containing degree of each of the reference section features in the audio signal.

By using the containing degree in this way, it is possible to classify the audio signal in accordance with the reference indicating how long a reference section feature corresponding to each type of sound is contained in the audio signal.

(c) In the audio classification device described in the section (b), the integrated feature extraction unit may calculate the containing degree of each of the reference section features, based on a proportion of a number of sections in which the reference section feature has a higher section similarity than any other of the reference section features to a total number of the plurality of sections contained in the audio signal.

By calculating the containing degree in this way, the containing degree is represented as a proportion without dependence on the length of the audio signal. Accordingly, as data of the reference section features, it is possible to use a fixed reference without regard for the length of an audio signal that is a classification target.

(d) In the audio classification device described in the section (c), the reference section feature storage unit may further store therein a coefficient for use in calculating the containing degree of each of the reference section features, and the integrated feature extraction unit may calculate, as the containing degree, a product of the proportion and the coefficient.

By calculating the containing degree in this way, it is possible to weight the proportion of each of the reference section features contained in the audio signal. A lower coefficient is set for a reference section feature having a lower importance degree, and a higher coefficient is set for a reference section feature having a higher importance degree. Accordingly, it possible to calculate an integrated feature, focusing on a reference section feature having a higher importance degree.

(e) In the audio classification device described in the section (b), the section feature extraction unit may include: an acoustic feature extraction subunit operable, with respect to each of the plurality of sections, to extract an acoustic feature indicating an acoustic MFCC (Mel-Frequency Cepstral Coefficient); and a reference acoustic feature storage subunit that stores therein a plurality of reference acoustic features that are each a reference for a comparison with each of the extracted acoustic features, the section feature extracted with respect to each of the plurality of sections may be data composed of an acoustic similarity indicating a degree of correlation between the acoustic feature calculated with respect to the section and each of the reference acoustic features stored in the reference acoustic feature storage subunit, and the section feature extraction unit may extract the section feature with respect to each of the plurality of sections, based on the acoustic feature extracted with respect to the section by the acoustic feature extraction subunit and the reference acoustic features stored in the reference acoustic feature storage subunit.

With this structure, it is possible to perform classification with use of the features represented by the MFCC. Specifically, a feature of a human voice can be accurately represented by the MFCC, for example.

(f) In the audio classification device described in the section (b), the section feature extraction unit may include: an acoustic feature extraction subunit operable, with respect to each of the plurality of sections, to extract an acoustic feature indicating an acoustic frequency spectrum; and a reference acoustic feature storage subunit that stores therein a plurality of reference acoustic features that are each a reference for a comparison with each of the extracted acoustic features, the section feature extracted with respect to each of the plurality of sections may be data composed of an acoustic similarity indicating a degree of correlation between the acoustic feature calculated with respect to the section and each of the reference acoustic features stored in the reference acoustic feature storage subunit, and the section feature extraction unit may extract the section feature with respect to each of the plurality of sections, based on the acoustic feature extracted with respect to the section by the acoustic feature extraction subunit and the reference acoustic features stored in the reference acoustic feature storage subunit.

With this structure, it is possible to perform classification with use of the features represented by the frequency spectrum. A feature of pitch of audio can be accurately represented by the frequency spectrum, for example.

(g) In the audio classification device described in the section (e), the reference integrated feature storage unit may store therein a plurality of reference integrated features that differ from each other, in one-to-one correspondence with categories into one of which the audio signal is to be classified, and the classification unit may make a comparison between the integrated feature of the audio signal and each of the reference integrated features to calculate an integrated similarity indicating a degree of correlation between the integrated feature and each of the reference integrated features, and classify the audio signal into one of the categories that corresponds to one of the reference integrated features having the highest integrated similarity with the integrated feature.

With this structure, it is possible to classify the audio signal into any one of the plurality of categories.

(h) The audio classification device described in the section (e) may further comprise: an audio storage unit operable to store therein a plurality of audio signals; and a creation unit operable to create reference integrated features based on integrated features extracted from the audio signals stored in the audio storage unit, and store the created reference integrated features in the reference integrated feature storage unit.

With this structure, it is possible to create reference integrated features with use of audio signals for reference creation, without preparing reference integrated features in the reference integrated feature storage unit in advance.

Also, even in the case where the reference integrated features have been prepared in the reference integrated feature storage unit in advance, it is possible to create reference integrated features that are classification references suitable for each user, by using audio signals held by the user to create the reference integrated features.

(i) The audio classification device described in the section (e) may further comprise a reference section feature creation unit operable to create reference section features based on section features extracted from a plurality of sections contained in each of the plurality of audio signals stored in the audio storage unit, and store the created reference section features in the reference section feature storage unit.

With this structure, it is possible to create reference section features with use of audio signals for reference creation, without preparing reference section features in the reference section feature storage unit in advance.

Also, even in the case where the reference section features have been prepared in the reference section feature storage unit in advance, it is possible to create reference section features suitable for each user, by using audio signals held by the user to create the reference section features.

Note that, in this case, it is necessary to create one or more reference integrated features in accordance with the created reference section features.

INDUSTRIAL APPLICABILITY

The audio classification device relating to the present invention is applicable to a mobile phone having a moving image shooting function, a digital video camera, a video recording device, and the like.

REFERENCE SIGNS LIST 100 video recording device
103 audio extraction unit
104 audio classification unit
105 classification information storage unit
201 acoustic feature extraction unit
202 reference acoustic feature storage unit
203 section feature extraction unit
204 reference section feature storage unit
205 section similarity calculation unit
206 integrated feature extraction unit
207 reference integrated feature storage unit
208 classification unit
1501 reference creation unit
1601 reference audio storage unit
1602 reference acoustic feature creation unit
1603 reference section feature creation unit
1604 reference integrated feature creation unit

The invention claimed is:
1. An audio classification device comprising:
a processor;
an acquisition unit operable to acquire an audio signal;
a section feature extraction unit operable, with respect to each of a plurality of sections each having a predetermined length contained in the audio signal, to extract a section feature relating to an audio frequency distribution;
a reference section feature storage unit that stores therein a plurality of reference section features that are each a reference for a comparison with each of the extracted section features;
a calculation unit operable, with respect to each of the plurality of sections, to make a comparison between the section feature and each of the reference section features to calculate a section similarity indicating a degree of correlation between the section feature and each of the reference section features;
an integrated feature extraction unit operable to extract, from the audio signal, an integrated feature relating to the plurality of sections, the integrated feature being calculated based on the section similarity calculated with respect to each of the plurality of sections;
a reference integrated feature storage unit that stores therein one or more reference integrated features that are each a reference in a different category for a comparison with the integrated feature; and
a classification unit operable to make a comparison between the integrated feature with each of the one or more reference integrated features, and classify the audio signal based on a result of the comparison, wherein
the integrated feature and the reference integrated features are each composed of a combination of respective containing degrees indicating how much of the reference section features are contained therein, and
the classification unit specifies, by the comparison, one of the reference integrated features that has a highest similarity to the integrated feature in terms of combination of containing degree, and classifies the audio signal to a category indicated by the reference integrated feature having the highest similarity.

2. The audio classification device of claim 1, wherein
the integrated feature extraction unit calculates, for each of the reference section features, the containing degree indicating how much of a section, in which the reference section feature has a higher section similarity than any other of the reference section features, is contained in the audio signal.

3. The audio classification device of claim 2, wherein
the integrated feature extraction unit calculates the containing degree of each of the reference section features, based on a proportion of a number of sections in which the reference section feature has a higher section similarity than any other of the reference section features to a total number of the plurality of sections contained in the audio signal.

4. The audio classification device of claim 3, wherein
the reference section feature storage unit further stores therein a coefficient for use in calculating the containing degree of each of the reference section features, and
the integrated feature extraction unit calculates, as the containing degree, a product of the proportion and the coefficient.

5. The audio classification device of claim 2, wherein
the section feature extraction unit includes:
an acoustic feature extraction subunit operable, with respect to each of the plurality of sections, to extract an acoustic feature indicating an acoustic MFCC (Mel-Frequency Cepstral Coefficient); and
a reference acoustic feature storage subunit that stores therein a plurality of reference acoustic features that are each a reference for a comparison with each of the extracted acoustic features,
the section feature extracted with respect to each of the plurality of sections is data composed of an acoustic similarity indicating a degree of correlation between the acoustic feature calculated with respect to the section and each of the reference acoustic features stored in the reference acoustic feature storage subunit, and
the section feature extraction unit extracts the section feature with respect to each of the plurality of sections, based on the acoustic feature extracted with respect to the section by the acoustic feature extraction subunit and the reference acoustic features stored in the reference acoustic feature storage subunit.

6. The audio classification device of claim 2, wherein
the section feature extraction unit includes:
an acoustic feature extraction subunit operable, with respect to each of the plurality of sections, to extract an acoustic feature indicating an acoustic frequency spectrum; and
a reference acoustic feature storage subunit that stores therein a plurality of reference acoustic features that are each a reference for a comparison with each of the extracted acoustic features,
the section feature extracted with respect to each of the plurality of sections is data composed of an acoustic similarity indicating a degree of correlation between the acoustic feature calculated with respect to the section and each of the reference acoustic features stored in the reference acoustic feature storage subunit, and
the section feature extraction unit extracts the section feature with respect to each of the plurality of sections, based on the acoustic feature extracted with respect to the section by the acoustic feature extraction subunit and the reference acoustic features stored in the reference acoustic feature storage subunit.

7. The audio classification device of claim 5, wherein
the reference integrated feature storage unit stores therein a plurality of reference integrated features that differ from each other, in one-to-one correspondence with categories into one of which the audio signal is to be classified, and
the classification unit makes a comparison between the integrated feature of the audio signal and each of the reference integrated features to calculate an integrated similarity indicating a degree of correlation between the integrated feature and each of the reference integrated features, and classifies the audio signal into one of the categories that corresponds to one of the reference integrated features having the highest integrated similarity with the integrated feature.

8. The audio classification device of claim 5, further comprising:
an audio storage unit operable to store therein a plurality of audio signals; and
a creation unit operable to create reference integrated features based on integrated features extracted from the audio signals stored in the audio storage unit, and store the created reference integrated features in the reference integrated feature storage unit.

9. The audio classification device of claim 8, further comprising
a reference section feature creation unit operable to create reference section features based on section features extracted from a plurality of sections contained in each of the plurality of audio signals stored in the audio storage unit, and store the created reference section features in the reference section feature storage unit.

10. An audio classification method comprising:
an acquisition step of acquiring an audio signal;
a section feature extraction step of, with respect to each of a plurality of sections each having a predetermined length contained in the audio signal, extracting a section feature relating to an audio frequency distribution;
a calculation step of, with respect to each of the plurality of sections, making a comparison between the section feature and each of a plurality of reference section features to calculate a section similarity indicating a degree of correlation between the section feature and each of the reference section features, the reference section features each being a reference for a comparison with each of the section features;
an integrated feature extraction step of extracting, from the audio signal, an integrated feature relating to the plurality of sections, the integrated feature being calculated based on the section similarity calculated with respect to each of the plurality of sections; and
a classification step of making a comparison between the integrated feature with each of one or more reference integrated features that are each a reference in a different category for a comparison with the integrated feature, and classifying the audio signal based on a result of the comparison, wherein
the integrated feature and the reference integrated features are each composed of a combination of respective containing degrees indicating how much of the reference section features are contained therein, and
the classification step specifies, by the comparison, one of the reference integrated features that has a highest similarity to the integrated feature in terms of combination of containing degree, and classifies the audio signal to a category indicated by the reference integrated feature having the highest similarity.

11. A non-transitory recording medium having recorded therein a program for causing a computer to execute processing, the processing comprising:

an acquisition step of acquiring an audio signal;

a section feature extraction step of, with respect to each of a plurality of sections each having a predetermined length contained in the audio signal, extracting a section feature relating to an audio frequency distribution;

a calculation step of, with respect to each of the plurality of sections, making a comparison between the section feature and each of a plurality of reference section features to calculate a section similarity indicating a degree of correlation between the section feature and each of the reference section features, the reference section features each being a reference for a comparison with each of the section features;

an integrated feature extraction step of extracting, from the audio signal, an integrated feature relating to the plurality of sections, the integrated feature being calculated based on the section similarity calculated with respect to each of the plurality of sections; and a classification step of making a comparison between the integrated feature with each of one or more reference integrated features that are each a reference in a different category for a comparison with the integrated feature, and classifying the audio signal based on a result of the comparison, wherein the integrated feature and the reference integrated features are each composed of a combination of respective containing degrees indicating how much of the reference section features are contained therein, and the classification step specifies, by the comparison, one of the reference integrated features that has a highest similarity to the integrated feature in terms of combination of containing degree, and classifies the audio signal to a category indicated by the reference integrated feature having the highest similarity.

12. An integrated circuit comprising:

an acquisition unit operable to acquire an audio signal;

a section feature extraction unit operable, with respect to each of a plurality of sections each having a predetermined length contained in the audio signal, to extract a section feature relating to an audio frequency distribution;

a reference section feature storage unit that stores therein a plurality of reference section features that are each a reference for a comparison with each of the extracted section features;

a calculation unit operable, with respect to each of the plurality of sections, to make a comparison between the section feature and each of the reference section features to calculate a section similarity indicating a degree of correlation between the section feature and each of the reference section features;

an integrated feature extraction unit operable to extract, from the audio signal, an integrated feature relating to the plurality of sections, the integrated feature being calculated based on the section similarity calculated with respect to each of the plurality of sections;

a reference integrated feature storage unit that stores therein one or more reference integrated features that are each a reference in a different category for a comparison with the integrated feature; and a classification unit operable to make a comparison between the integrated feature with each of the one or more reference integrated features, and classify the audio signal based on a result of the comparison, wherein the integrated feature and the reference integrated features are each composed of a combination of respective containing degrees indicating how much of the reference section features are contained therein, and the classification unit specifies, by the comparison, one of the reference integrated features that has a highest similarity to the integrated feature in terms of combination of containing degree, and classifies the audio signal to a category indicated by the reference integrated feature having the highest similarity.

* * * * *